United States Patent [19]
Sato et al.

[11] Patent Number: 5,440,531
[45] Date of Patent: Aug. 8, 1995

[54] MAGNETO-OPTICAL REPRODUCING METHOD

[75] Inventors: Masatoshi Sato; Jun Saito, both of Tokyo; Hideki Akasaka, Yokohama, all of Japan

[73] Assignee: Nikon Corporation, Tokyo, Japan

[21] Appl. No.: 275,662

[22] Filed: Jul. 15, 1994

Related U.S. Application Data

[60] Continuation of Ser. No. 91,905, Jul. 16, 1993, abandoned, which is a division of Ser. No. 453,255, Dec. 20, 1989, Pat. No. 5,239,524, which is a continuation of Ser. No. 90,973, Aug. 31, 1987, abandoned, which is a continuation-in-part of Ser. No. 870,350, Jun. 4, 1986, abandoned.

[30] Foreign Application Priority Data

| Jun. 11, 1985 | [JP] | Japan | 60-126775 |
| Sep. 11, 1985 | [JP] | Japan | 60-201423 |
| Sep. 30, 1985 | [JP] | Japan | 60-217313 |
| Sep. 4, 1986 | [JP] | Japan | 61-208608 |

[51] Int. Cl.$^6$ .............................................. G11B 13/04
[52] U.S. Cl. ................................... 369/13; 360/54
[58] Field of Search .................. 369/13, 14; 360/59, 360/114; 365/122; 428/694 ML

[56] References Cited

U.S. PATENT DOCUMENTS 4,910,622  3/1990  Saito et al. ............................ 369/13

FOREIGN PATENT DOCUMENTS

| 58-50639 | 3/1983 | Japan | 369/13 |
| 58-57646 | 4/1983 | Japan | 369/13 |
| 63-311645 | 12/1988 | Japan | 369/13 |
| 1179246 | 7/1989 | Japan | 369/13 |

*Primary Examiner*—Georgia Y. Epps
*Assistant Examiner*—Tan Dinh
*Attorney, Agent, or Firm*—Shapiro and Shapiro

[57] ABSTRACT

A magnetooptical recording method for recording data using a bit having upward-magnetization and a bit having downward-magnetization on a recording layer of a magnetooptical recording medium comprises the steps of using, as the medium, a multilayered magnetic recording medium consisting of a first layer having a perpendicular magnetic anisotropy acting as a recording layer, and a second layer having a perpendicular magnetic anisotropy acting as a reference layer; moving the medium; applying an initial field so that, before recording, the direction of magnetization of the recording layer is left unchanged, and that of the reference layer is aligned either upward or downward; radiating a laser beam onto the medium; pulse modulating an intensity of the laser beam in accordance with binary data to be recorded; when the laser beam is radiated, applying a bias field to the irradiated portion; and when the intensity of the pulse-modulated laser beam is at high level, forming one of the bit having upward-magnetization and that having downward-magnetization, and when the intensity of the pulse-modulated laser beam is at low level, forming the other bit.

5 Claims, 22 Drawing Sheets

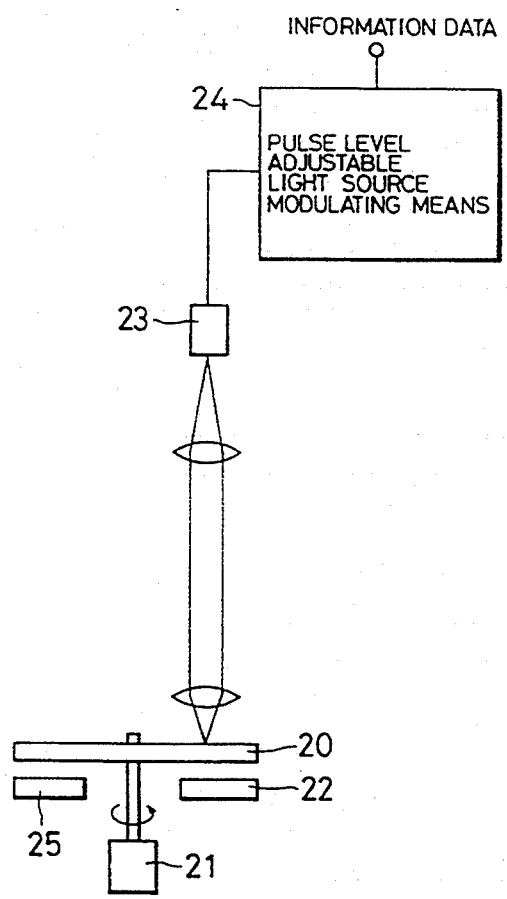
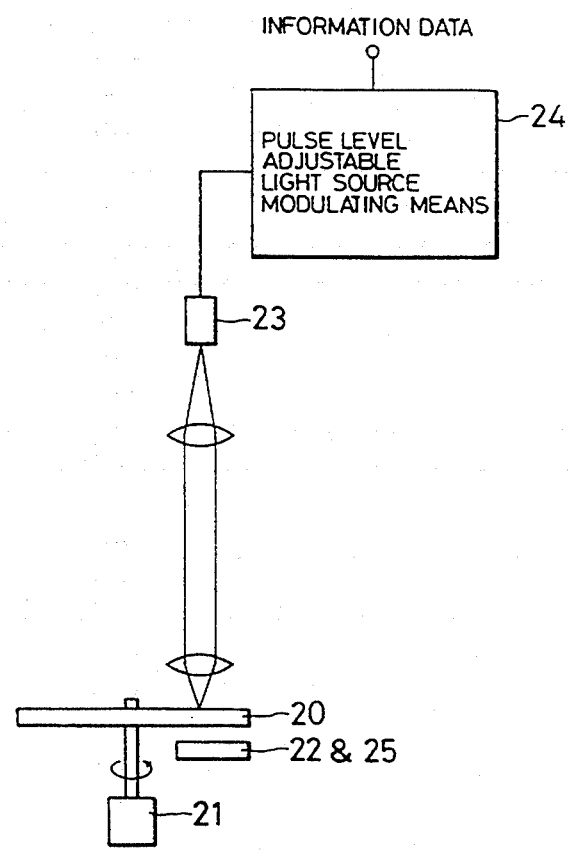

FIG. 7A
| FIRST LAYER : RECORDING LAYER |
| SECOND LAYER: REFERENCE LAYER |
FIG. 7B
| RECORDING LAYER 1 | ⇓ ⇓ ⇑ ⇓ ⇓ ⇑ ⇓ ⇓ ⇓ |
| REFERENCE LAYER 2 | ⇑ ⇑ ⇑ ⇑ ⇑ ⇑ ⇑ ⇑ ⇑ |
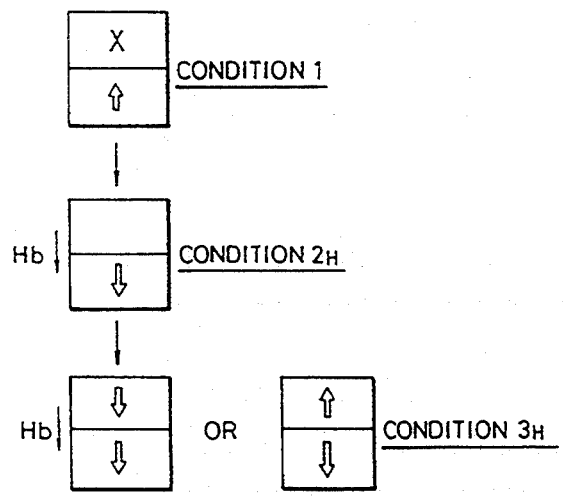
FIG. 8
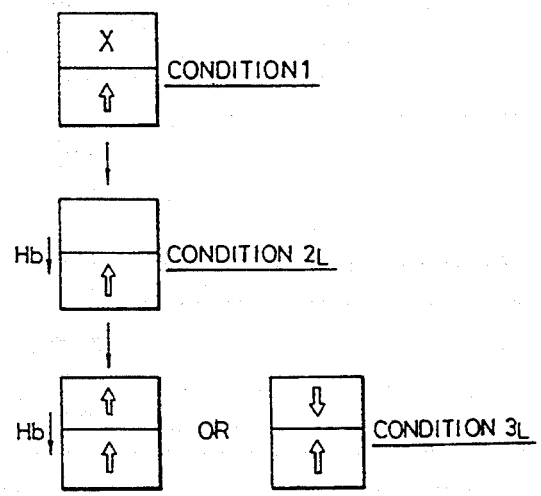
FIG. 9

FIG. 10
P-TYPE MEDIUM
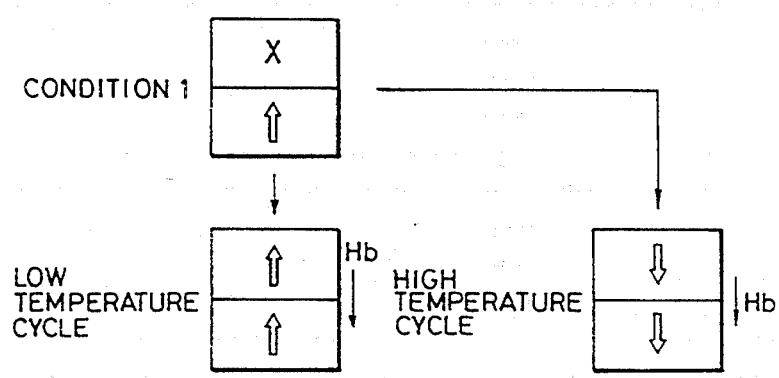
A-TYPE MEDIUM
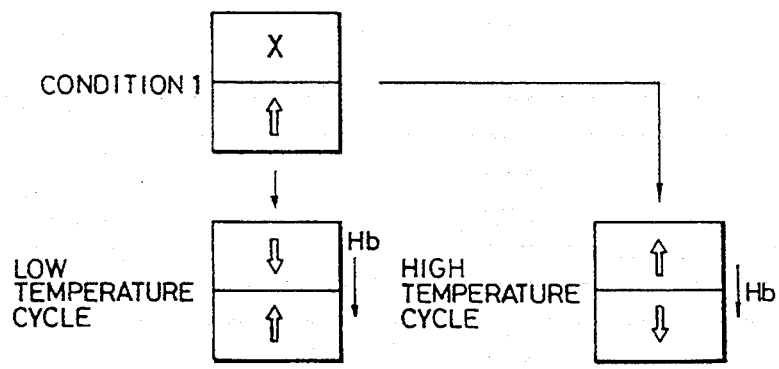

TYPE 1

TYPE 2

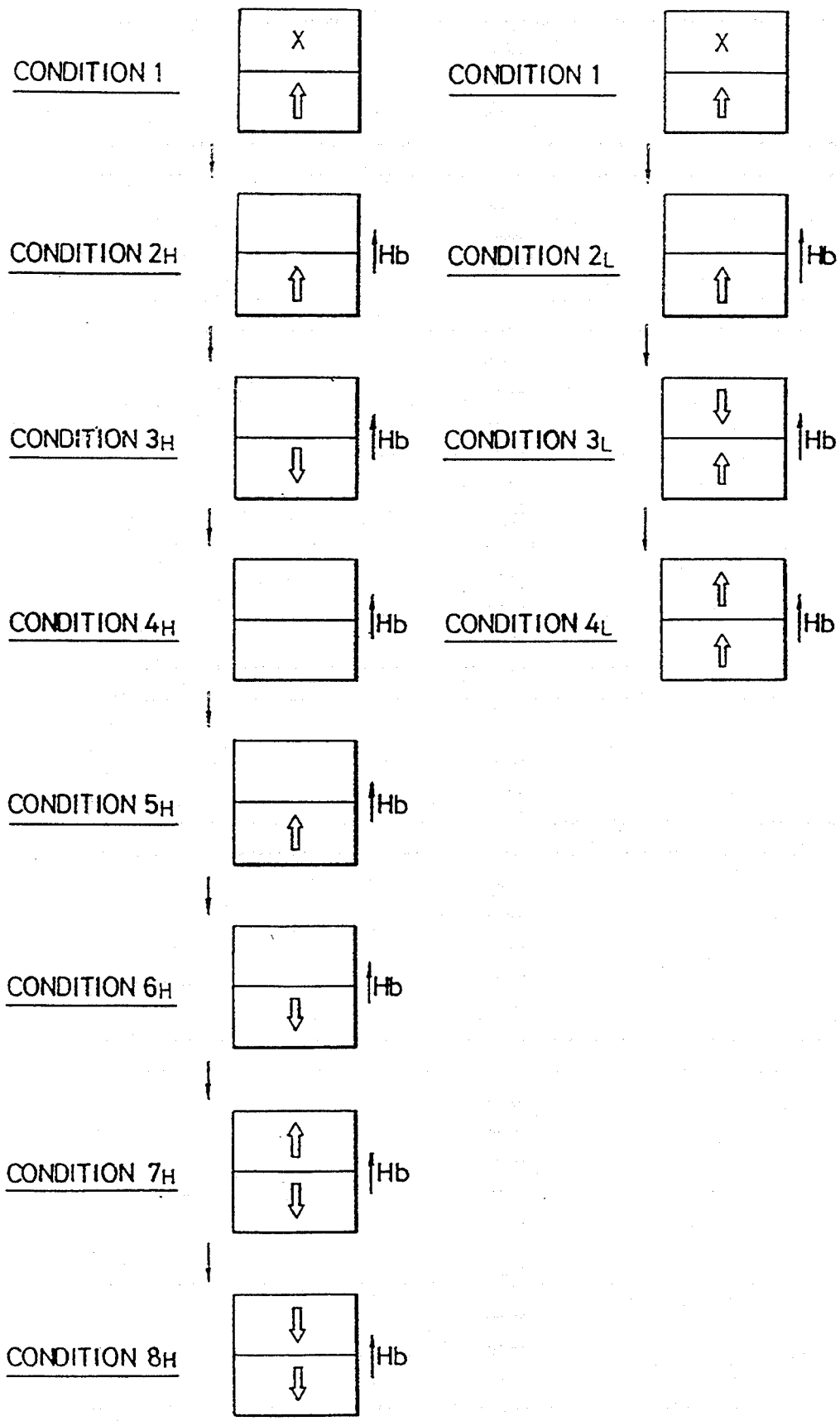

FIG. 29
FIG. 30
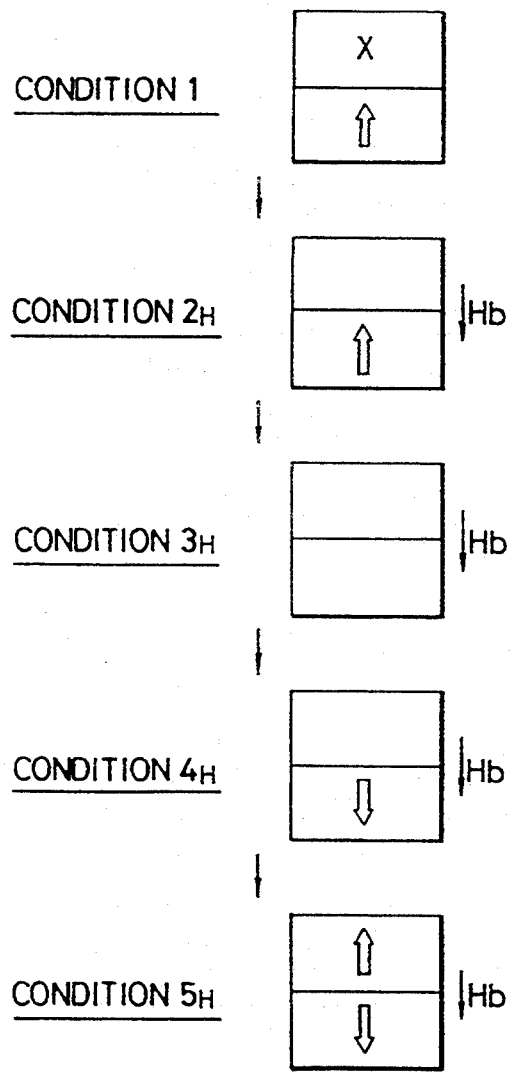
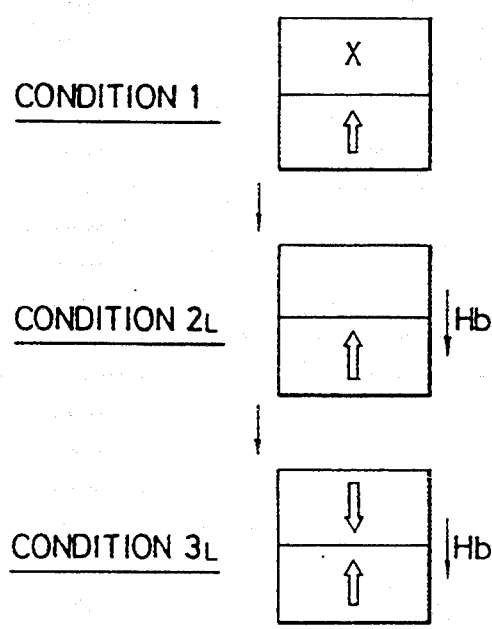

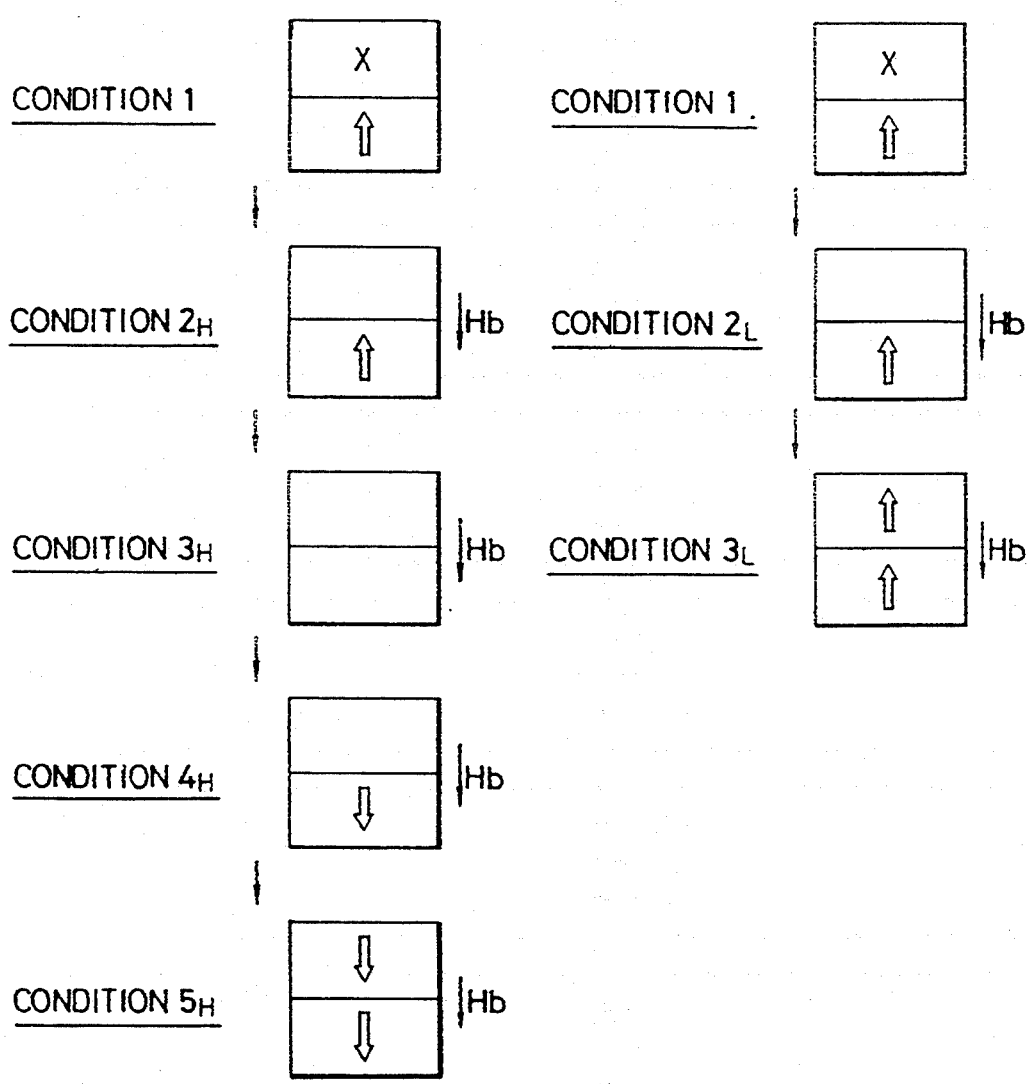

FIG. 38
FIG. 39
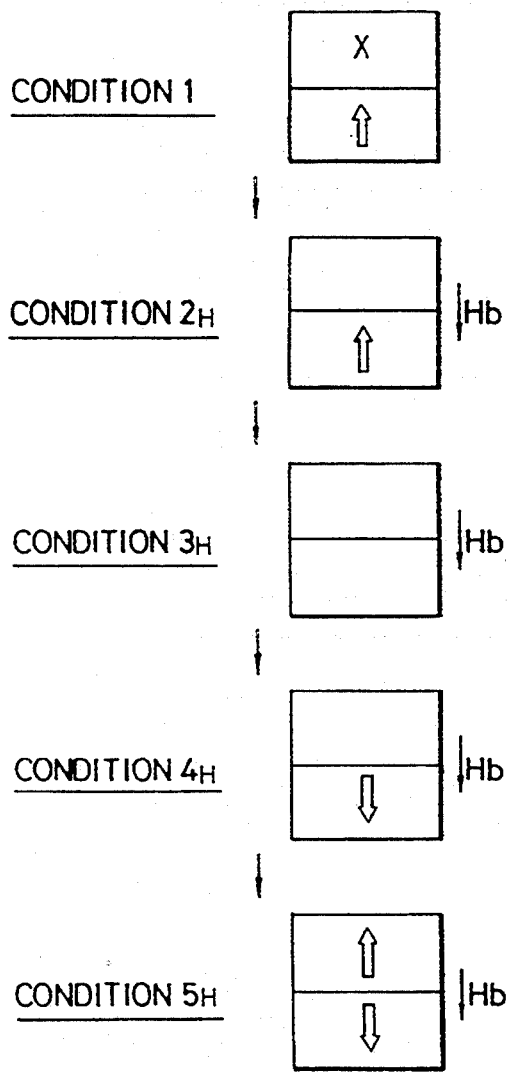
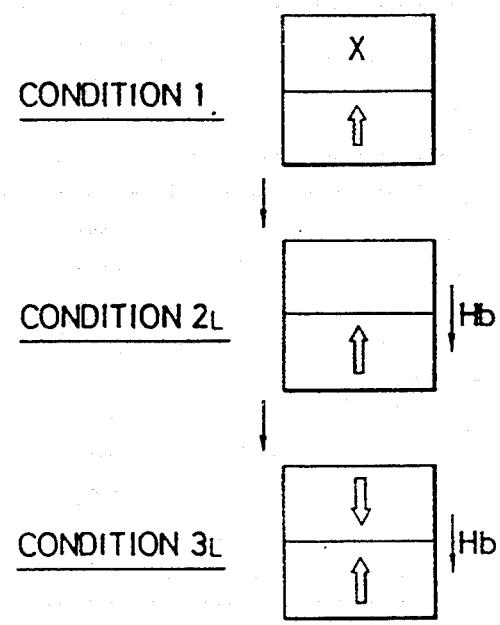

F I G. 40
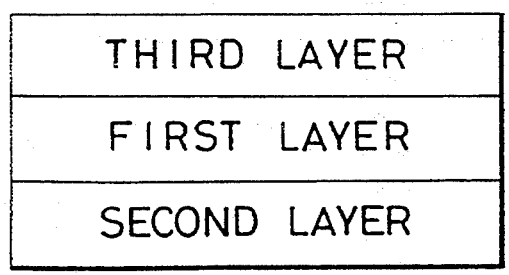
F I G. 41
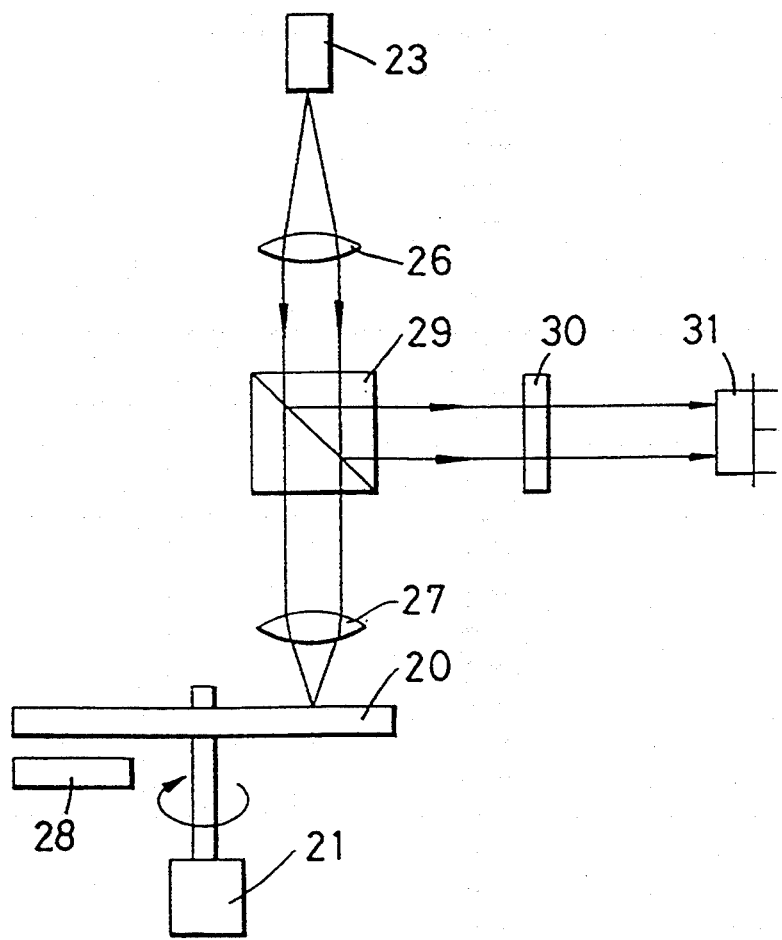

MAGNETO-OPTICAL REPRODUCING METHOD

CROSS-REFERENCE TO RELATED APPLICATION

This is a continuation of application Ser. No. 08/091,905 filed Jul. 16, 1993 (now abandoned); which is a division of application Ser. No. 07/453,255 filed Dec. 20, 1989, now U.S. Pat. No. 5,239,524, issued Aug. 24, 1993; which is a continuation of application Ser. No. 07/090,973 filed Aug. 31, 1987 (abandoned); which is a continuation-in-part of application Ser. No. 06/870,350 filed Jun. 4, 1986 (abandoned).

BACKGROUND OF THE INVENTION

1. Field of the Invention

The present invention relates to a magnetooptical recording method and a magnetooptical recording apparatus and a medium used therefor and, more particularly, to an over write capable magnetooptical recording method, an over write capable magnetooptical recording apparatus and an over write capable medium.

2. Related Background Art

In recent years, many efforts have been made to develop an optical recording/reproduction method, an optical recording apparatus and a medium used therefor, which can satisfy various requirements including high density, large capacity, high speed access, and high recording/reproduction speed.

Of various optical recording/reproduction methods, the magnetooptical recording/reproduction method is most attractive due to its unique advantages that information can be erased after use and new information can be written thereon.

A recording medium used in a magnetooptical recording/reproduction method has a perpendicular magnetic layer or layers as a recording layer. The magnetic layer comprises, for example, amorphous GdFe, GdCo, GdFeCo, TbFe, TbCo, TbFeCo, and the like. Concentric or spiral tracks are formed on the recording layer, and data is recorded on the tracks. Note that in this specification, one of the "upward" and "downward" directions of magnetization with respect to a film surface is defined as an "A direction" and the other one is defined as a "non-A direction". Data to be recorded is binarized in advance, and is recorded by a bit ($B_1$) having "A-directed" magnetization and a bit ($B_0$) having "non-A-directed" magnetization. These bits $B_1$ and $B_0$ correspond to "1" and "0" levels of a digital signal, respectively. However, in general, the direction of magnetization of the recording tracks can be aligned in the "non-A direction" by applying a strong bias field before recording. This processing is called "initialization". Thereafter, the bit ($B_1$) having "A-directed" magnetization is formed on the tracks. Data is recorded in accordance with the presence/absence and/or a bit length of the bit ($B_1$).

Principle of Bit Formation

In the bit formation, a characteristic feature of a laser, i.e., excellent coherence in space and time, is effectively used to focus a beam into a spot as small as the diffraction limit determined by the wavelength of the laser light. The focused light is radiated onto the track surface to write data by producing bits less than 1 μm in diameter on the recording layer. In the optical recording, a recording density up to $10^8$ bit/cm$^2$ can be theoretically attained, since a laser beam can be concentrated into a spot with a size as small as its wavelength.

As shown in FIG. 1, in the magnetooptical recording, a laser beam L is focused onto a recording layer 1 to heat it, while a bias field (Hb) is externally applied to the heated portion in the direction opposite the initialized direction. A coersivity Hc of the locally heated portion is decreased below the bias field (Hb). As a result, the direction of magnetization of that portion is aligned in the direction of the bias field (Hb). In this way, reversely magnetized bits are formed.

Ferromagnetic and ferrimagnetic materials differ in the temperature dependencies of the magnetization and Hc. Ferromagnetic materials have Hc which decreases around the Curie temperature and allow data recording based on this phenomenon. Thus, data recording in ferromagnetic materials is referred to as Tc recording (Curie temperature recording).

On the other hand, ferrimagnetic materials have a compensation temperature, below the Curie temperature, at which magnetization (M) becomes zero. The Hc abruptly increases around this temperature and hence abruptly decreases outside this temperature. The decreased Hc is cancelled by a relatively weak bias field (Hb). Namely, recording is enabled. This process is called Tcomp. recording (compensation point recording).

In this case, however, there is no need to adhere to the Curie point or temperatures therearound, and the compensation temperature. In other words, if a bias field (Hb) capable of cancelling a decreased Hc is applied to a magnetic material having the decreased Hc at a pre-determined temperature higher than a room temperature, recording is enabled.

Principle of Reading

FIG. 2 illustrates the principle of data reading based on the magnetooptical effect. Light is an electromagnetic wave with an electromagnetic-field vector normally emanating in all directions in a plane perpendicular to the light path. When light is converted to linearly polarized beams (Lp) and radiated onto a recording layer (1), it is reflected by or passes through the recording layer (1). At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by "non-A-direction" magnetized bit ($B_0$) cannot pass through the analyzer. However, a product (X sin $2\theta_k$)$^2$ of the light reflected by a bit ($B_1$) magnetized along the "A direction" passes through the analyzer and becomes incident on a detector (photoelectric conversion means). As a result, the bit ($B_1$) magnetized along the "A direction" looks brighter than the bit ($B_0$) magnetized along the "non-A direction", and the detector produces a stronger electrical signal for the bit ($B_1$). The electrical signal from the detector is modulated in accordance with the recorded data, thus reading the data.

SUMMARY OF THE INVENTION

In order to re-use a recorded medium, (i) the medium must be re-initialized by an initializing device, (ii) an erasing head as well as a recording head must be added to a recording apparatus, or (iii) recorded data must be erased using a recording apparatus or an erasing apparatus as preliminary processing.

Therefore, in the conventional magnetooptical recording method, an over-write operation, which allows new data recording regardless of the presence/absence of the recorded data, is impossible.

If the direction of a bias field (Hb) can be freely changed between the "A direction" and "non-A direction", an over-write operation is possible. However, the direction of the bias field (Hb) cannot be changed at high speed. For example, when a bias field (Hb) applying means is a permanent magnet, the direction of the magnet must be mechanically reversed. In this case, it is impossible to rotate the direction of the magnet at high speed. Similarly, when the bias field (Hb) applying means is an electromagnet, the direction of such a large current cannot be reversed at high speed.

It is, therefore, a first object of the present invention to provide a magnetooptical recording method capable of over writing by modulating light without changing the direction of the bias field (Hb).

It is a second object of the present invention to provide a magnetooptical recording apparatus capable of over writing.

It is a third object of the present invention to provide a magnetooptical recording medium capable of over writing.

According to the present invention, there is provided a magnetooptical recording method, in which data is recorded on a recording layer of a magnetooptical recording medium using a bit having upward-magnetization and a bit having downward-magnetization, the method comprising the steps of:

(a) using, as the medium, a multilayered magnetic recording medium consisting of a first layer having a perpendicular magnetic anisotropy acting as a recording layer, and a second layer having a perpendicular magnetic anisotropy acting as a reference layer;

(b) moving said medium;

(c) applying an initial field so that, before recording, the direction of magnetization of the recording layer is left unchanged, and that of the reference layer is aligned either upward or downward;

(d) radiating a laser beam onto the medium;

(e) pulse modulating an intensity of the laser beam in accordance with binary data to be recorded;

(f) when the laser beam is radiated, applying a bias field to the irradiated portion; and (g) when the intensity of the pulse-modulated laser beam is at high level, forming one of the bit having upward-magnetization and that having downward-magnetization, and when the intensity of the pulse-modulated laser beam is at low level, forming the other bit.

With the method of the present invention, the laser beam is pulse modulated based on data to be recorded. However, this procedure itself has been performed in the conventional magnetooptical recording method, and a means for pulse modulating the beam intensity based on two-valued or binary data to be recorded is a known means. For example, see "THE BELL SYSTEM TECHNICAL JOURNAL", Vol. 62 (1983) pp. 1923-1936.

A characteristic feature of the present invention lies in high and low levels of the beam intensity. More specifically, when the beam intensity is at high level, "A-directed" magnetization of the reference layer is reversed to the "non-A direction" by means of a bias field (Hb), and a bit having the "non-A-directed" (or "A-directed) magnetization is thus formed in the recording layer by means of the "non-A-directed" magnetization of the reference layer. When the beam intensity is at low level, a bit having the "A-directed" (or "non-A-directed") magnetization is formed in the recording layer by means of the "A-directed" magnetization of the reference layer. If required high and low levels are given, it is easy for a person skilled in the art to modulate the beam intensity according to the present invention only by partially modifying the modulating means.

In this specification, if expressions ooo (or xxx) appear, ooo outside the parentheses in the first expression corresponds to ooo in the subsequent expressions ooo (or xxx), and vice versa.

As is well known, even if recording is not performed, a laser beam is often turned on at very low level* in order to, for example, access a predetermined recording position on the medium. When the laser beam is also used for reading, the laser beam is often turned on at an intensity of the very low level*. In this invention, the intensity of the laser beam may be set at this very low level. However, low level for forming a bit is higher than the very low level*. Therefore, the output waveform of the laser beam of the present invention is as shown in FIG. 5.

According to the present invention, there is provided a magnetooptical recording apparatus capable of over writing, comprising:

(a) means for moving a magnetooptical recording medium;

(b) initial field applying means;

(c) a laser beam source;

(d) means for pulse modulating a beam intensity in accordance with binary data to be recorded to obtain (1) high level that provides, to the medium, a temperature suitable for forming one of a bit having upward-magnetization and a bit having downward-magnetization, and to obtain (2) low level that provides, to the medium, a temperature suitable for forming the other bit; and (e) bias field applying means, which can be commonly used as the initial field applying means.

The modulating means is available by partially modifying a conventional beam modulating means if high and low levels of the beam intensity are provided. Such a modification would be easy for those skilled in the art.

In addition, according to the present invention, there is provided an over-write capable multilayered magnetooptical recording medium consisting of a first layer having a perpendicular magnetic anisotropy as a recording layer, and a second layer having a perpendicular magnetic anisotropy as a reference layer.

The present invention is divided into first and second aspects. In both the aspects, the recording medium has a multilayered structure, which is divided into two layers, as shown in FIG. 7A.

The first layer is the recording layer, which exhibits high coersivity at room temperature and has low reversing temperature. The second layer is the reference layer, which exhibits low coercivity at room temperature and has a higher reversing temperature than the first layer. Both the layers comprise perpendicular magnetic layers. Note that each of the first and second layers can comprise a multilayered structure. If necessary, another layer can be interposed between the first and second layers. In addition, a clear boundary between the first and second layers need not be formed, and one layer can be gradually converted into the other layer.

Furthermore, as shown in FIG. 40, a third layer (transcription layer) may be arranged on the side of the first layer (recording layer) to be in direct contact therewith or through another layer.

The third layer is adapted to transcribe data recorded in the first layer, and is a transcription layer having a higher magnetooptical effect and a smaller coersivity at a room temperature than those of the first layer. The third layer comprises a perpendicular magnetization film.

Therefore, when data recorded in the first layer is reproduced, a reproduction beam is radiated on the third layer, and data is reproduced from a beam reflected by the third layer. Thus, a C/N ratio can be improved as compared to a case wherein data is reproduced from the first layer.

In the first aspect, the coersivity of a recording layer 1 is represented by $H_{C1}$; that of a reference layer 2, $H_{C2}$; the Curie temperature of the recording layer 1, $T_{C1}$; that of the reference layer 2, $T_{C2}$; the room temperature, $T_R$; the temperature of the recording medium when a low level laser beam is radiated, $T_L$; that when a high level laser beam is radiated, $T_H$; a coupling field applied to the recording layer 1, $H_{D1}$; and a coupling field applied to the reference layer 2, $H_{D2}$. In this case, the recording medium satisfies the following Formula 1, and satisfies Formulas 2 to 5 at the room temperature.

$T_R < T_{C1} \approx T_L < T_{C2} \approx T_H$   Formula 1

$H_{C1} > H_{C2} + |H_{D1} \mp H_{D2}|$   Formula 2

$H_{C1} > H_{D1}$   Formula 3

$H_{C2} > H_{D2}$   Formula 4

$H_{C2} + H_{D2} < |Hini.| < H_{C1} \pm H_{D1}$   Formula 5

In the above formula, symbol "$\approx$" means "equal to" or "substantially equal to". In addition, of double signs $\pm$ and $\mp$, the upper sign corresponds to an A (antiparallel) type medium, and the lower sign corresponds to a P (parallel) type medium (these media will be described later). Note that the P type medium includes a ferromagnetic material.

The relationship between the coersivity and the temperature is as shown in the graph of FIG. 6. Referring to FIG. 6, the thin curve represents the characteristics of the recording layer 1 and the bold curve represents those of the reference layer 2.

Therefore, when an initial field (Hini.) is applied to the recording medium at room temperature, the direction of magnetization of the reference layer 2 is reversed without reversing that of the recording layer 1, according to Formula 5. When the initial field (Hini.) is applied to the recording layer before recording, the reference layer 2 can be magnetized in the "A direction" (in the drawings, the "A direction" is indicated by an upward arrow "⇧", and the "non-A direction" is indicated by a downward arrow "⇩"). If the initial field (Hini.) is decreased to zero, the direction of magnetization ⇧ of the reference layer 2 can be left unchanged without being re-reversed, according to Formula 4.

FIG. 7B schematically shows a state wherein only the reference layer 2 is magnetized in the "A direction" ⇧ immediately before recording.

Referring to FIG. 7B, the direction of magnetization in the recording layer 1 represents previously recorded data. Since the direction of magnetization in the recording layer 1 does not change the basic operation mechanism, it is indicated by X in the following description, The table in FIG. 7B is modified as shown in Condition 1 in FIG. 8 for the sake of simplicity.

In Condition 1, the high-level laser beam is radiated onto the recording medium to increase the medium temperature to $T_H$. Since $T_H$ is higher than the Curie temperature $T_{C1}$, magnetization of the recording layer 1 disappears. In addition, since $T_H$ is near the Curie temperature $T_{C2}$, magnetization of the reference layer 2 also disappears completely or almost completely. The bias field (Hb) in the "A direction" or "non-A direction" is applied to the medium in accordance with the type thereof. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam and is cooled by air. When the temperature of the medium is decreased under the presence of the field Hb, the direction of magnetization of the reference layer 2 is reversed to the "non-A direction" based on the field Hb (Condition $2_H$ in FIG. 8).

When the medium is further cooled and the medium temperature is decreased below $T_{C1}$, magnetization of the recording layer 1 appears again. In this case, the direction of magnetization of the recording layer 1 is influenced by that of the reference layer 2 due to a magnetic coupling (exchange coupling) force. As a result, magnetization ⇧ (the P type medium) or ⇩ (the A type medium) is formed in accordance with the type of the medium, as shown in Condition $3_H$ in FIG. 8.

A change in conditions due to high-level laser beam irradiation is called a high-temperature cycle herein.

Next, in Condition 1 in FIG. 9, the low-level laser beam is radiated onto the medium to increase the medium temperature to $T_L$. Since $T_L$ is near the Curie temperature $T_{C1}$, magnetization of the recording layer 1 disappears completely or almost completely. However, since $T_L$ is below the Curie temperature $T_{C2}$, magnetization of the reference layer 2 does not disappear (Condition $2_L$ in FIG. 9). In Condition $2_L$, although the bias field (Hb) is unnecessary, it cannot be turned on or off at high speed. Therefore, the bias field (Hb) is left applied inevitably.

However, since the coersivity $H_{C2}$ is maintained high, the direction of magnetization of the reference layer 2 will not be reversed due to the field Hb. Since the medium is moving, a given irradiated portion is immediately separated from the laser beam and is cooled by air. As cooling progresses, magnetization of the recording layer 1 appears. The direction of magnetization is influenced by that of the reference layer 2 due to the magnetic coupling force. As a result, magnetization ⇧ (the P type medium) or ⇩ (the A type medium) appears in accordance with the type of the medium. This magnetization is not changed even at the room temperature (Condition $3_L$ in FIG. 9).

A change in conditions due to low-level laser beam irradiation is called a low-temperature cycle herein.

FIG. 10 summarizes the above descriptions. Referring to FIG. 10, bits, having either magnetization ⇑ or ⇓, which are opposite to each other, are formed in the high- and low-temperature cycles regardless of the direction of magnetization in the recording layer 1. More specifically, an over-write operation is enabled by pulse modulating the laser beam between high level (high-temperature cycle) and low level (low-temperature cycle) in accordance with data to be recorded.

Note that the recording medium normally has a disk shape, and is rotated during recording. For this reason, a recorded portion (bit) is again influenced by the initial field (Hini.) during a single rotation. As a result, the direction of magnetization of the reference layer 2 is aligned along the original "A direction" ⇑. However, at the room temperature, magnetization of the reference layer can no longer influence that of tile recording layer 1, and the recorded data can be held.

If linearly polarized light is radiated onto the recording layer 1, since light reflected thereby includes data, data can be reproduced as in the conventional magnetooptical recording medium.

However, a presently available material of the second layer has a larger magnetooptical effect than that of the first layer. Therefore, if data is left in the second layer like in a state immediately after recording, data can be reproduced from light reflected by the second layer to have a high C/N ratio.

When the disk-shaped medium after recording is influenced by the initial field Hini. and the second layer is magnetized in the A direction ⇑ or the non-A direction ⇓, the direction of some bits recorded on the first layer is unnatural with respect to that of the second layer. More specifically, in the P type medium the direction of some bits of the first layer is antiparallel to the direction of magnetization of the second layer. In the A type medium, the direction of some bits of the first layer is parallel to the direction of magnetization of the second layer. In this case, a magnetic wall is formed between the first and second layers, and a rather unstable state is set.

Therefore, when a reproduction field $H_R$ in a direction opposite to that of the field Hini. is applied to the medium in this state, the magnetization of the portion of the second layer where the magnetic wall is formed is reversed upon influence of the bits of the first layer. As a result, the magnetic wall is extinguished, and a stable state can be established. This state is the same as that immediately after recording. Therefore, since recorded data also appears in the second layer, data can be reproduced from the second layer.

Therefore, the present invention also provides the following reproduction method.

More specifically, a reproduction method for over write capable magnetooptical recording is characterized in that in a disk-shaped multilayered magnetooptical recording medium capable of over writing comprising a first layer, serving as a recording layer, in which data is recorded in the form of a bit having upward magnetization and a bit having downward magnetization and which has a perpendicular magnetic anisotropy, and a second layer, serving as a reference layer, which has a perpendicular magnetic anisotropy having magnetization aligned in an upward or downward direction, data recorded in the first layer is transcribed to the second layer upon application of a reproduction magnetic field before reproduction, and the transcribed data is reproduced.

The present invention provides the following reproduction apparatus.

A reproduction apparatus for magnetooptical recording, is characterized by comprising:

(a) means for rotating a disk-shaped multilayered magnetooptical recording medium capable of over writing comprising a first layer, serving as a recording layer, in which data is recorded in the form of a bit having upward magnetization and a bit having downward magnetization and which has a perpendicular magnetic anisotropy, and a second layer, serving as a reference layer, which has a perpendicular magnetic anisotropy having magnetization aligned in an upward or downward direction;

(b) reproduction magnetic field applying means for transcribing data recorded in the first layer to the second layer;

(c) a linearly polarized light source; and (d) reproduction means for receiving reflection light of the linearly polarized light radiated on the second layer and reproducing data included in the reflection light in the form of an electrical signal.

The intensity of a reproduction field $H_R$ preferably satisfies the following condition:

$$H_{C2} - (\sigma_w/2M_{S2}t_2) < |H_R| < H_{C2} + (\sigma_w/2M_{S2}t_2)$$

where
$H_{C2}$: coersivity of second layer
$M_{S2}$: saturation magnetic moment of second layer
$t_2$: film thickness of second layer
$\sigma_w$: interface magnetic wall energy
$H_R$: reproduction field A perpendicular magnetic film constituting the recording layer 1 and the reference layer 2 is selected from the group consisting of (1) crystalline or amorphous ferromagnetic or ferrimagnetic materials having the Curie temperature and no compensation temperature, and (2) crystalline or amorphous ferrimagnetic materials having both the compensation temperature and the Curie temperature.

The first aspect utilizing the Curie temperature has been described. In contrast to this, the second aspect of the present invention utilizes decreased coersivity $H_C$ at a predetermined temperature exceeding the room temperature. The second aspect uses a temperature $T_{S1}$ at which the recording layer 1 is magnetically coupled to the reference layer 2, in place of the temperature $T_{C1}$ in the first aspect. In addition, instead of the temperature $T_{C2}$, a temperature $T_{S2}$ at which the reference layer 2 is reversed under the influence of the field Hb is used. Thereby, the second aspect can provide the same effect as in the first aspect.

In the second aspect, the coersivity of the recording layer 1 is represented by $H_{C1}$; that of the reference layer 2, $H_{C2}$; a temperature at which the recording layer 1 is magnetically coupled to the reference layer 2, $T_{S1}$; a temperature at which the direction of magnetization of the reference layer 2 is reversed upon influence of the field Hb, $T_{S2}$; room temperature, $T_R$; a temperature of the medium when a low-level laser beam is applied thereto, $T_L$; a temperature of the medium when a high-level laser beam is applied thereto, $T_w$; a coupling field applied to the recording layer 1, $H_{D1}$; and a coupling field applied to the reference layer 2, $H_{D2}$. In this case, the recording medium satisfies the following Formula 6, and satisfies Formulas 7 to 10 at the room temperature.

$$T_R < T_{S1} \approx T_L < T_{S2} \approx T_H \qquad \text{Formula 6}$$

$$H_{C1} > H_{C2} + |H_{D1} \mp H_{D2}| \qquad \text{Formula 7}$$

$$H_{C1} > H_{D1} \qquad \text{Formula 8}$$

$$H_{C2} > H_{D2} \qquad \text{Formula 9}$$

$$H_{C2} + H_{D2} < |H_{ini.}| < H_{C1} \pm H_{D1} \qquad \text{Formula 10}$$

In the above formulas, upper signs of double signs $\pm$ and $\mp$ correspond to an A (antiparallel) type medium, and lower signs correspond to a P (parallel) medium (these media will be described later).

In the first and second aspects, the recording medium is constituted by the recording layer 1 and the reference layer 2, each of which preferably comprises an amorphous ferrimagnetic material selected from transition metal (e.g., Fe, Co)—heavy rare earth metal (e.g., Gd, Tb, Dy, and the like) alloy compositions.

When the recording layer 1 and the reference layer 2 are both selected from the transition metal—heavy rare earth metal alloy compositions, the direction and level of magnetization appearing outside the alloy are determined by the relationship between the direction and level of spin (magnetic moment) of transition metal atoms (to be referred to as TM hereinafter) and those of heavy rare earth metal atoms (to be referred to as RE hereinafter) inside the alloy. For example, the direction and level of TM spin are represented by a vector ↑, those of RE spin are also indicated by a vector ↓, and the direction and level of magnetization of the alloy as a whole are represented by a double-solid vector ⇑. In this case, the vector ⇑ is represented by a sum of vectors ↑ and ↓. However, in the alloy, the vectors ↑ and ↓ are directed in the opposite directions due to the mutual effect of the TM spin and the RE spin. Therefore, when these vectors are equal to each other, the sum of TM and RE vectors ↓ and ↑ is zero (i.e., the level of magnetization appearing outside the alloy is zero). The alloy composition making the sum of vectors zero is called a compensation composition. When the alloy has another composition, it has a strength equal to a difference between the strengths of both the spins, and has a vector ( ⇑ or ⇓ ) having a direction equal to that of the larger of the TM and RE vectors. Magnetization of this vector appears outside the alloy.

When one of the strengths of the vectors of the RE spin and TM spin is larger than the other, the alloy composition is referred to as "oo rich" named after the larger spin name (e.g., RE rich).

The recording layer 1 and the reference layer 2 can be classified into TM rich and RE rich compositions. Therefore, if the composition of the recording layer 1 is plotted along the ordinate and that of the reference layer 2 is plotted along the abscissa, the types of the recording media according to the present invention can be classified into four quadrants, as shown in FIG. 11. The P type medium described previously belongs to Quadrant I and III, and the A type medium belongs to Quadrant II and IV. Referring to FIG. 11, the intersection (origin) of the abscissa and the ordinate represents the compensation composition of both the layers.

In view of a change in coersivity against a change in temperatures, a certain alloy composition has characteristics wherein the coersivity temporarily increases infinitely and then abruptly decreases before a temperature reaches the Curie temperature (at which the coersivity is zero). The temperature corresponding to the infinite coersivity is called a compensation temperature (Tcomp.). No compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types. The recording medium in Quadrant I includes all the four types of media. The graphs of FIGS. 12A to 12D respectively show the relationship between the coersivity and the temperature of the four types of media. Note that thin curves represent characteristics of the recording layer 1 and bold curves represent those of reference layer 2.

When the recording layer 1 and the reference layer 2 are classified in view of their RE or TM rich characteristics and in view of the presence/absence of the compensation temperature, they can be classified into 9 classes.

TABLE 1

| Quadrant I | | | |
| --- | --- | --- | --- |
| Class | First Layer: RE rich | Second Layer: RE rich | Type |
| 1 | Tcomp. | Tcomp. | 1 |
| 2 | No Tcomp. | Tcomp. | 2 |
| 3 | Tcomp. | No Tcomp. | 3 |
| 4 | No Tcomp. | No Tcomp. | 4 |
| Quadrant II | | | |
| Class | First Layer: RE rich | Second Layer: TM rich | Type |
| 5 | Tcomp. | No Tcomp. | 3 |
| 6 | No Tcomp. | No Tcomp. | 4 |
| Quadrant III | | | |
| Class | First Layer: TM rich | Second Layer: TM rich | Type |
| 7 | No Tcomp. | No Tcomp. | 4 |
| Quadrant IV | | | |
| Class | First Layer: TM rich | Second Layer: RE rich | Type |
| 8 | No Tcomp. | Tcomp. | 2 |
| 9 | No Tcomp. | No Tcomp. | 4 |

The principle of the method of the present invention will be described in detail using a specific medium No. 1 belonging to Class 1 (P type, Quadrant I, Type 1) shown in Table 1.

The medium No. 1 satisfies Formula 11:

$$T_R < T_{comp.1} < T_{C1} \approx T_L \approx T_{comp.2} < T_{C2} \approx T_H$$

The graph of FIG. 13 shows this relation. Note that thin curves indicate the first layer, and bold curves indicate the second layer. Those identifications are the same in the following graphs.

A condition that reverses the direction of magnetization of the reference layer 2 without reversing that of the recording layer 1 by the initial field (Hini.) at the room temperature $T_R$ is represented by Formula 12. The medium No. 1 satisfies Formula 12 at the $T_R$.

$$H_{C1} > H_{C2} + (\sigma_w/2M_{S1}t_1) + (\sigma_w/2M_{S2}t_2)$$

where
- $H_{C1}$: coersivity of recording layer 1
- $H_{C2}$: coersivity of reference layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 15. If the Hini. disappears, reversed magnetization of the reference layer 2 is influenced by magnetization of the recording layer 1 due to an exchange coupling force. The condition that can hold the direction of magnetization of the layer 2 is represented by Formulas 13 and 14. The medium No. 1 satisfies Formulas 13 and 14.

$$H_{C1} > (\sigma_w/2M_{S1}t_1) \qquad \text{Formula 13}$$

$$H_{C2} > (\sigma_w/2M_{S2}t_2) \qquad \text{Formula 14}$$

$$H_{C2} + (\sigma_w/2M_{S2}t_2) < |Hini.| < H_{C1} - (\sigma_w/2M_{S1}t_1) \qquad \text{Formula 15}$$

The layer 2's magnetization of the recording medium which can satisfy Formulas 12 to 14 at the $T_R$ is aligned along the "A direction" ↕ (↑↓) by the Hini. which satisfies Formula 15. At this time, the recording layer 1 is maintained in the recorded state (Condition 1 in FIGS. 14 and 15).

Condition 1 is held to a point immediately before the recording. In this case, the bias field (Hb) is applied in the direction of ↑.

The high-temperature cycle will now be described with reference to FIG. 14.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 11disappears (Condition $2_H$).

When the laser-beam radiation further continues, the temperature of the medium increases accordingly. When the temperature of the medium slightly exceeds the temperature Tcomp.2 of the reference layer 2, the relationship between the strengths of the RE and TM vectors is reversed (↑↓ → ↑↓) although the directions of the RE and TM spins remain the same. For this reason, the direction of magnetization of the layer 2 is reversed to be along the "non-A direction" ↕ (Condition $3_H$).

However, since the coersivity $H_{C2}$ is still high at this temperature, the direction of magnetization of the layer 2 will not be reversed by the field Hb (↑). When the temperature further increases and reaches the temperature $T_H$, the temperature of the layer 2 substantially corresponds to the Curie temperature $T_{C2}$, and magnetization of the layer 2 also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization appears in the layer 2. In this case, magnetization ↕ (↓↑) is generated by ↑Hb (Condition $5_H$). However, since the temperature is yet higher than the temperature $T_{C1}$, no magnetization appears in the layer 1.

When the temperature of the medium further decreases below the temperature Tcomp.2, the relationship between the strengths of the RE and TM vectors is reversed (↓↑ → ↓↑) although the directions of the RE and TM spins remain the same. As a result, the direction of magnetization of the alloy as a whole is reversed from ↕ to the "non-A direction" ↕ (Condition $6_H$).

In Condition $6_H$, since the temperature of the medium is higher than the temperature $T_{C1}$, magnetization of the layer 1 has not yet appeared. In addition, since the coersivity $H_{C2}$ at this temperature is high the direction of magnetization ↕ of the layer 2 cannot be reversed by the field ↑Hb.

When the temperature of the medium decreases and is slightly below the temperature $T_{C1}$, magnetization appears in the layer 1. At this time, the exchange coupling force from the layer 2 acts to align each of the RE and TM spins (↓ and ↑) of the layers 1 and 2. Since the temperature of the layer 1 is higher than the temperature Tcomp.1, the TM spin is larger than the RE spin, and hence, magnetization of ↓↑, i.e., ↕ appears in the layer 1. This state is Condition $7_H$.

When the temperature of the medium is decreased from the temperature in Condition $7_H$ and is below the temperature Tcomp.1, the relationships between the strengths of the RE and TM spins of the layer 1 is reversed (↓↑ → ↓↑). As a result, magnetization of ↕ appears (Condition $8_H$).

Then, the temperature of the medium decreases from the temperature in Condition $8_H$ to the room temperature. Since the coersivity $H_{C1}$ at the room temperature is sufficiently high, Condition $8_H$ is maintained without reversing the direction of magnetization of the layer 1 by the field ↑Hb. In this way, bit formation in the "non-A direction" ↕ is completed.

Next, the low-temperature cycle will be described with reference to FIG. 15.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears (Condition $2_L$).

In Condition 2L, when an irradiated portion is separated from the laser beam spot, the medium temperature begins to fall. When the medium temperature is slightly below the temperature $T_{C1}$, the recording layer 1 is influenced by the RE land TM spins (↑↓) of the reference layer 2 due to the exchange coupling force. In other words, the exchange coupling force acts to align each of the RE and TM spins (↑ and ↓) of the layers 1 and 2. As a result, magnetization of ↑↓, i.e., ↕, without regard to the bias field ↑Hb, appears in the layer 1 (Condition 3L). Since the temperature in Condition $3_L$ is higher than the temperature Tcomp.1, the TM spin is larger than the RE spin.

When the medium temperature is decreased below the temperature Tcomp.1, the relationship between the RE and TM spins of the first layer is reversed (↑↓ → ↑↓) in the same manner as in the high-temperature cycle. As a result, the magnetization of the layer 1 is ↕ (Condition $4_L$).

Condition $4_L$ is maintained even if the medium temperature is decreased to the room temperature. In this way, bit formation in the "A direction" ↕ is completed.

The principle of the method of the present invention will be described in detail using a specific medium No. 2 belonging to Class 2 (P type, Quadrant I, Type 2) shown in Table 1.

The medium No. 2 satisfies Formula 16:

$$T_R < T_{C1} \approx T_L \approx T_{comp.2} < T_{C2} \approx T_H$$

The graph of FIG. 16 shows this relation.

A condition that reverses the direction of magnetization of the reference layer 2 without reversing that of the recording layer 1 by the initial field (Hini.) at the room temperature $T_R$ is represented by Formula 17. The medium No. 2 satisfies Formula 17 at the $T_R$:

$$H_{C1} > H_{C2} + (\sigma_w/2M_{S1}t_1) + (\sigma_w/2M_{S2}t)$$

where $H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 20. If the Hini. disappears, reversed magnetization of the reference layer 2 is influenced by magnetization of the recording layer 1 due to an exchange coupling force. The condition that can hold the direction of magnetization of the layer 2 is represented by Formulas 18 and 19. The medium No. 2 satisfies Formulas 18 and 19.

$$H_{C1} > (\sigma_w/2M_{S1}t_1) \qquad \text{Formula 18}$$

$$H_{C2} > (\sigma_w/2M_{S2}t_2) \qquad \text{Formula 19}$$

$$H_{C2} + (\sigma_w/2M_{S2}t) < |Hini.| < H_{C1} - (\sigma_w/2M_{S1}t_1) \qquad \text{Formula 20}$$

The layer 2's magnetization of the recording medium which can satisfy Formulas 17 to 19 at the $T_R$ is aligned along the "A direction" ◊ (↑ ↓) by the Hini. which satisfies Formula 20. At this time, the recording layer 1 is maintained in the recorded state (Condition 1 in FIGS. 17 and 18).

Condition 1 is held to a point immediately before the recording. In this case, the bias field (Hb) is applied in the direction of ↑.

The high-temperature cycle will now be described with reference to FIG. 17.

High-Temperature Cycle

In Condition 1, when the medium temperature increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation further continues, the temperature of the medium increases accordingly. When the temperature of the medium slightly exceeds the temperature Tcomp.2 of the reference layer 2, the relationship between the strengths of the RE and TM vectors is reversed (↑ ↓ → ↑ ↓) although the directions of the RE and TM spins remain the same. For this reason, the direction of magnetization of the layer 2 is reversed to the "non-A direction" ◊ ◊ (Condition $3_H$).

However, since the coersivity $H_{C2}$ is still high at this temperature, the direction of magnetization of the layer 2 will not be reversed by the field Hb(↑). When the temperature further increases and reaches the temperature $T_H$, the temperature of the layer 2 substantially corresponds to the Curie temperature $T_{C2}$, and magnetization of the layer 2 also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization appears in the layer 2. In this case, magnetization ◊ (↓ ↑) is generated by ↑ Hb (Condition $5_H$). However, since the temperature is yet higher than the temperature $T_{C1}$, no magnetization appears in the layer 1.

When the temperature of the medium further decreases below the temperature Tcomp.2, the relationship between the strengths of the RE and TM vectors is reversed (↓ ↑ → ↓ ↑) although the directions of the RE and TM spins remain the same. As a result, direction of magnetization of the alloy as a whole is reversed from ◊ to the "non-A direction" ◊ (Condition $6_H$). F In Condition $6_H$, since the temperature of the medium is higher than the temperature $T_{C1}$, magnetization of the layer 1 has not yet appeared. In addition, since the coersivity $H_{C2}$ at this temperature is high, the direction of magnetization ◊ of the layer 2 cannot be reversed by the field ↑ Hb.

When the temperature of the medium decreases and is slightly below the temperature $T_{C1}$, magnetization appears in the layer 1. At this time, the exchange coupling force from the layer 2 acts to align each of the RE and TM spins (↓ and ↑) of the layers 1 and 2. Thus, magnetization of ↓ ↑, i.e., ◊ appears in the layer 1. This state is Condition $7_H$.

Then, the temperature of the medium decreases from the temperature in Condition $7_H$ to the room temperature. Since the coersivity $H_{C1}$ at the room temperature is sufficiently high, Condition $7_H$ is maintained without reversing the direction of magnetization of the layer 1 by the field ↑ Hb. In this way, bit formation in the "non-A direction" is completed.

Next, the low-temperature cycle will be described with reference to FIG. 18.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears (Condition $2_L$).

In Condition $2_L$, when an irradiated portion is separated from the laser beam spot, the medium temperature begins to fall. When the medium temperature is slightly below the temperature $T_{C1}$, the recording layer 1 is influenced by the RE and TM spins (↑ ↓) of the reference layer 2 due to the exchange coupling force. In other words, the exchange coupling force acts to align each of the RE and TM spins (↑ and ↓) of the layers 1 and 2. As a result, magnetization of ↑ ↓, i.e., ◊, appears in the layer 1 (Condition $3_L$).

Condition $3_L$ is maintained even if the medium temperature is decreased to the room temperature. As a result, a bit in the "A direction" is formed in the recording layer 1.

The principle of the method of the present invention will be described in detail using a specific medium No.

3 belonging to Class 3 (P type, Quadrant I, Type 3) shown in Table 1.

The medium No. 3 satisfies Formula 21:

$$T_R < T\text{comp.1} < T_{C1} \approx T_L < T_{C2} \approx T_H$$

The graph of FIG. 19 shows this relation.

A condition that reverses the direction of magnetization of the reference layer 2 without reversing that of the recording layer 1 by the initial field (Hini.) at the room temperature $T_R$ is represented by Formula 22. The medium No. 3 satisfies Formula 22 at the $T_R$:

$$H_{C1} > H_{C2} + (\sigma_w/2M_{S1}t_1) + (\sigma_w/2M_{S2}t_2)$$

where $H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 25. If the Hini. disappears, reversed magnetization of the reference layer 2 is influenced by magnetization of the recording layer 1 due to an exchange coupling force. The condition that can hold the direction of magnetization of the layer 2 is represented by Formulas 23 and 24. The medium No. 3 satisfies Formulas 23 and 24.

$$H_{C1} > (\sigma_w/2M_{S1}t_1) \quad \text{Formula 23}$$

$$H_{C2} > (\sigma_w/2M_{S2}t_2) \quad \text{Formula 24}$$

$$H_{C2} + (\sigma_w/2M_{S2}t_2) < |Hini.| < H_{C1} - (\sigma_w/2M_{S1}t_1) \quad \text{Formula 25}$$

The layer 2's magnetization of the recording medium which can satisfy Formulas 22 to 24 at the $T_R$ is aligned along the "A direction" ⇑ (↑ ↓) by the Hini. which satisfies Formula 25. At this time, the recording layer 1 is maintained in the recorded state (Condition 1 in FIGS. 20 and 21).

Condition 1 is held to a point immediately before the recording. In this case, the bias field (Hb) is applied in the direction of ↓.

The high-temperature cycle will now be described with reference to FIG. 20.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$). When the laser-beam radiation further continues, since the temperature $T_H$ of the medium is substantially equal to the temperature $T_{C2}$, magnetization of the layer 2 also disappears (Condition $3_H$).

In Condition $3_H$, when an irradiated portion is separated from the laser beam spot, the temperature of the medium begins to decrease. When the temperature of the medium decreases slightly below the temperature $T_{C2}$, magnetization appears in the layer 2. In this case, magnetization ⇑ (↑ ↓) is generated by ↓ Hb. However, since the temperature is yet higher than the temperature $T_{C1}$, no magnetization appears in the layer 1. This state is Condition $4_H$.

When the temperature of the medium decreases and is slightly below the temperature $T_{C1}$, magnetization appears in the layer 1. At this time, the exchange coupling force from the layer 2 acts to align each of the RE and TM spins (↓ and ↑) of the layers 1 and 2. Since the temperature of the medium is higher than the temperature Tcomp.1, the TM spin is larger than the RE spin (↓ ↑). As a result, magnetization of ⇑ appears in the layer 1 (Condition $5_H$).

When the medium temperature further decreases from the temperature in Condition $5_H$ and is below the temperature Tcomp.1, the relationship between the strengths of the TM and RE spins of the layer 1 is reversed (↓ ↑ → ↓ ↑). For this reason, the direction of magnetization of the layer 1 is reversed to the "non-A direction" ⇓ (Condition $6_H$).

Then, the temperature of the medium decreases from the temperature in Condition $6_H$ to the room temperature. Since the coersivity $H_{C1}$ at the room temperature is sufficiently high, magnetization of the layer 1 is stably maintained. In this way, bit formation in the "non-A direction" is completed.

Next, the low-temperature cycle will be described with reference to FIG. 21.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. However, at this temperature, since the coersivity $H_{C2}$ of the layer 2 is sufficiently high, magnetization of the layer 2 will not be reversed by the bias field ↓ Hb (Condition $2_L$).

In Condition $2_L$, when an irradiated portion is separated from the laser beam spot, the medium temperature begins to fall. When the medium temperature is slightly below the temperature $T_{C1}$, the respective spins of the recording layer 1 are influenced by the RE and TM spins (↑ ↓) of the reference layer 2 due to the exchange coupling force. In other words, the exchange coupling force acts to align each of the RE and TM spins (↑ and ↓) of the layers 1 and 2. As a result, magnetization of ↑ ↓, i.e., ⇑, appears in the layer 1. In this case, since the medium temperature is higher than the temperature Tcomp.1, the TM spin is larger than the RE spin (Condition $3_L$).

When the medium temperature is further decreased below the temperature Tcomp.1, the relationship between the strengths of the RE and TM spins of the layer 1 is reversed in the same manner as in the high-temperature cycle (↑ ↓ → ↑ ↓). As a result, magnetization of ⇑, without regard to the bias field ↓ Hb, appears in the layer 1 (Condition $4_L$).

Condition $4_L$ is maintained even if the medium temperature is decreased to the room temperature. In this way, bit formation in the "A direction" ⇑ is completed.

The principle of the method of the present invention will be described in detail using a specific medium No. 4 belonging to Class 4 (P type, Quadrant I, Type 4) shown in Table 1.

The medium No. 4 satisfies Formula 26:

$$T_R < T_{C1} \approx T_L < T_{C2} \approx T_H$$

The graph of FIG. 22 shows this relation.

A condition that reverses the direction of magnetization of the reference layer 2 without reversing that of the recording layer 1 by the initial field (Hini.) at the room temperature $T_R$ is represented by Formula 27. The medium No. 4 satisfies Formula 27 at the $T_R$:

$$H_{C1} > H_{C2} + (\sigma_w/2M_{S1}t_1) + (\sigma_w/2M_{S2}t_2)$$

where
- $H_{C1}$: coersivity of recording layer 1
- $H_{C2}$: coersivity of reference layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface-wall enrgy At this time, a condition for the Hini. is represented by Formula 30. If the Hini. disappears, reversed magnetization of the reference layer 2 is influenced by magnetization of the recording layer 1 due to an exchange coupling force. The condition that can hold the direction of magnetization of the layer 2 is represented by Formulas 28 and 29. The medium No. 4 satisfies Formulas 28 and 29.

$$H_{C1} > (\sigma_w/2M_{S1}t_1) \quad \text{Formula 28}$$

$$H_{C2} > (\sigma_w/2M_{S2}t_2) \quad \text{Formula 29}$$

$$H_{C2} + (\sigma_w/2M_{S2}t_2) < |Hini.| < H_{C1} - (\sigma_w/2M_{S1}t_1) \quad \text{Formula 30}$$

The layer 2's magnetization of the recording medium which can satisfy Formulas 27 to 29 at the $T_R$ is aligned along the "A direction" ◌ ( ↑ ↓ ) by the Hini. which satisfies Formula 30. At this time, the recording layer 1 is maintained in the recorded state (Condition 1 in FIGS. 23 and 24).

Condition 1 is held to a point immediately before the recording. In this case, the bias field (Hb) is applied in the direction of ↑.

The high-temperature cycle will now be described with reference to FIG. 23.

High-Temperature Cycle

When the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation further continues and the medium temperature is equal to the temperature $T_H$, since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization ◌ ( ↓ ↑ ) is generated by ↓ Hb. However, since the temperature is yet higher than the temperature $T_{C1}$, no magnetization appears in the layer 1. This state is Condition $4_H$.

When the temperature of the medium decreases and is slightly below the temperature $T_{C1}$, magnetization appears in the layer 1. At this time, the exchange coupling force from the layer 2 acts to align each of the RE and TM spins ( ↓ and ↑ ) of the layers 1 and 2. As a result, magnetization of ↓ ↑, i.e., ◌ appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "non-A direction" is completed.

Next, the low-temperature cycle will be described with reference to FIG. 24.

Low-Temperature Cycle

In Condition 1 immediately before recording, the medium temperature is increased to $T_L$ upon irradiation of the low-level laser beam. Since the temperature $T_L$ exceeds the Curie temperature $T_{C1}$ of the recording layer 1, magnetization of the layer 1 disappears. However, at this temperature, since the coersivity $H_{C2}$ of the layer 2 is sufficiently high, magnetization of the layer 2 will not be reversed by the bias field ↓ Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the recording layer 1 are influenced by the RE and TM spins ( ↑ ↓ ) of the reference layer 2 due to the exchange coupling force. In other words, the exchange coupling force acts to align each of the RE and TM spins ( ↑ and ↓ ) of the layers 1 and 2. As a result, magnetization of ↑ ↓, i.e., ◌ , without regard to the bias field ↓ Hb, appears in the layer 1. This state is Condition $3_L$.

Condition $3_L$ is maintained even if the medium temperature is decreased to the room temperature. In this way, bit formation in the "A direction" ◌ is completed.

The principle of the method of the present invention will be described in detail using a specific medium No. 5 belonging to Class 5 (A type, Quadrant II, type 3) shown in Table 1.

The medium No. 5 satisfies Formula 31:

$$T_R < T_{comp.1} < T_{C1} \approx T_L < T_{C2} \approx T_H$$

The graph of FIG. 25 shows this relation.

A condition that reverses the direction of magnetization of the reference layer 2 without reversing that of the recording layer 1 by the initial field (Hini.) at the room temperature $T_R$ is represented by Formula 32.

The medium No. 5 satisfies Formula 32 at the $T_R$:

$$H_{C1} > H_{C2} + |(\sigma_w/2M_{S1}t_1) - (\sigma_w/2M_{S2}t_2)|$$

where
- $H_{C1}$: coersivity of recording layer 1
- $H_{C2}$: coersivity of reference layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 35. If the Hini. disappears, reversed magnetization of the reference layer 2 is influenced by magnetization of the recording layer 1 due to an exchange coupling force. The condition that can hold the direction of magnetization of the layer 2 is represented by Formulas 33 and 34. The medium No. 5 satisfies Formulas 33 and 34.

$$H_{C1} > (\sigma_w/2M_{S1}t_1) \quad \text{Formula 33}$$

$$H_{C2} > (\sigma_w/2M_{S2}t_2) \quad \text{Formula 34}$$

$$H_{C2} + (\sigma_w/2M_{S2}t_2) < |Hini.| < H_{C1} + (\sigma_w/2M_{S1}t) \quad \text{Formula 35}$$

The layer 2's magnetization of the recording medium which can satisfy Formulas 32 to 34 at the $T_R$ is aligned along the "A direction" ⇧ (↓ ↑) by the Hini. which satisfies Formula 35. At this time, the recording layer 1 is maintained in the recorded state (Condition 1 in FIGS. 26 and 27).

Condition 1 is held to a point immediately before the recording. In this case, the bias field (Hb) is applied in the direction of ↓.

The high-temperature cycle will now be described with reference to FIG. 26.

High-Temperature Cycle

When the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation further continues and the medium temperature is equal to the temperature $T_H$, since the temperature $T_H$ of the layer 2 is substantially equal to the Curie temperature $T_{C2}$, magnetization of the layer 2 also disappears (Condition $3_H$).

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization ⇧ (↑ ↓) is generated by ↓ Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 acts to align each of the RE and TM spins (↑ and ↓) of the layers 1 and 2. In this case, since the medium temperature is yet higher than the temperature Tcomp.1, the TM spin is larger than the RE spin (↑ ↓). As a result, magnetization of ⇧ appears in the layer 2 (Condition $5_H$).

When the medium temperature is decreased below the temperature Tcomp.1 from the temperature in Condition $5_H$, the relationship between the strengths of the TM and RE spins of the layer 1 is reversed (↑ ↓ → ↑ ↓). For this reason, magnetization of the layer 1 is reversed to the "A-direction" ⇧ (Condition $6_H$).

Then, the temperature of the medium decreases from the temperature in Condition $6_H$ to the room temperature. Since the coersivity $H_{C1}$ at the room temperature is sufficiently high, magnetization of the layer 1 is stably maintained. In this way, bit formation in the "A direction" is completed.

Next, the low-temperature cycle will be described with reference to FIG. 27.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. However, at this temperature, since the coersivity $H_{C2}$ of the layer 2 is sufficiently high, magnetization of the layer 2 will not be reversed by the bias field ↓ Hb (Condition $2_L$).

When the beam radiation is completed in Condition $2_L$, the medium temperature begins to fall. When the medium temperature is slightly below the temperature $T_{C1}$, the respective spins of the recording layer 1 are influenced by the RE and TM spins (↓ ↑) of the reference layer 2 due to the exchange coupling force. In other words, the exchange coupling force acts to align each of the RE and TM spins (↓ and ↑) of the layers 1 and 2. As a result, magnetization of ↓ ↑, i.e., ⇩, without regard to bias field ↓ Hb, appears in the layer 1. In this case, since the medium temperature is higher than the temperature Tcomp.1, the TM spin is larger than the RE spin (Condition $3_L$).

When the medium temperature is decreased below the temperature Tcomp.1, the relationship between the strengths of the RE and TM spins of the layer 1 is reversed as well as the high-temperature cycle (↓ ↑ → ↓ ↑). As a result, the magnetization of the layer 1 is ⇩ (Condition $4_L$).

Condition $4_L$ is maintained even if the medium temperature is decreased to the room temperature. In this way, bit formation in the "non-A direction" ⇩ is completed.

The principle of the method of the present invention will be described in detail using a specific medium No. 6 belonging to Class 6 (A type, Quadrant II, Type 4) shown in Table 1.

The medium No. 6 satisfies Formula 36:

$$T_R < T_{C1} \approx T_L < T_{C2} \approx T_H$$

The graph of FIG. 28 shows this relation.

A condition that reverses the direction of magnetization of the reference layer 2 without reversing that of the recording layer 1 by the initial field (Hini.) at the room temperature $T_R$ is represented by Formula 37. The medium No. 6 satisfies Formula 37 at the $T_R$:

$$H_{C1} > H_{C2} + |(\sigma_w/2M_{S1}t_1) - (\sigma_w/2M_{S2}t_2)|$$

where $H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 40. If the Hini. disappears, reversed magnetization of the reference layer 2 is influenced by magnetization of the recording layer 1 due to an exchange coupling force. The condition that can hold the direction of magnetization of the layer 2 is represented by Formulas 38 and 39. The medium No. 6 satisfies Formulas 38 and 39.

$$H_{C1} > (\sigma_w/2M_{S1}t_1) \quad \text{Formula 38}$$

$$H_{C2} > (\sigma_w/2M_{S2}t_2) \quad \text{Formula 39}$$

$$H_{C2} + (\sigma_w/2M_{S2}t_2) < |Hini.| < H_{C1} + (\sigma_w/2M_{S1}t_1) \quad \text{Formula 40}$$

The layer 2's magnetization of the recording medium which can satisfy Formulas 37 to 39 at the $T_R$ is aligned along the "A direction" ⇩ ( ↓ ↑ ) by the Hini. which satisfies Formula 40. At this time, the recording layer 1 is maintained in the recorded state (Condition 1 in FIGS. 29 and 30).

Condition 1 is held to a point immediately before the recording. In this case, the bias field (Hb) is applied in the direction of ↓.

The high-temperature cycle will now be described with reference to FIG. 29.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation further continues and the medium temperature is equal to the temperature $T_H$, since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization ⇩ ( ↑ ↓ ) is generated by ↓ Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 acts to align each of the RE and TM spins ( ↑ and ↓ ) of the layers 1 and 2. For this reason, magnetization ↑ ↓, i.e., ⇧, without regard to the bias field ↓ Hb, appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "A direction" ⇧ is completed.

Next, the low-temperature cycle will be described with reference to FIG. 30.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. In this state, however, since the coersivity $H_{C2}$ of the layer 2 is sufficiently high, magnetization ⇧ of the layer 2 will not be reversed by the bias field ↓ Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the recording layer 1 are influenced by the RE and TM spins ( ↓ ↑ ) of the reference layer 2 due to the exchange coupling force. In other words, the exchange coupling force acts to align each of the RE and TM spins ( ↓ and ↑ ) of the layers 1 and 2. As a result, magnetization of ↓ ↑, i.e., ⇩, appears in the layer 1. This state is Condition $3_L$.

Condition $3_L$ is maintained even if the medium temperature is decreased to the room temperature. In this way, bit formation in the "non-A direction" ⇩ is completed.

The principle of the method of the present invention will be described in detail using a specific medium No. 7 belonging to Class 7 (P type, Quadrant III, Type 4) shown in Table 1.

The medium No. 7 satisfies Formula 41:

$$T_R < T_{C1} \approx T_L < T_{C2} \approx T_H$$

The graph of FIG. 31 shows this relation.

A condition that reverses the direction of magnetization of the reference layer 2 without reversing that of the recording layer 1 by the initial field (Hini.) at the room temperature $T_R$ is represented by Formula 42. The medium No. 7 satisfies Formula 42 at the $T_R$:

$$H_{C1} > H_{C2} + (\sigma_w/2M_{S1}t_1) + (\sigma_w/2M_{S2}t_2)$$

where
- $H_{C1}$: coersivity of recording layer 1
- $H_{C2}$: coersivity of reference layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 45. If the Hini. disappears, reversed magnetization of the reference layer 2 is influenced by magnetization of the recording layer 1 due to an exchange coupling force. The condition that can hold the direction of magnetization of the layer 2 is represented by Formulas 43 and 44. The medium No. 7 satisfies Formulas 43 and 44.

$$H_{C1} > (\sigma_w/2M_{S1}t_1) \quad \text{Formula 43}$$

$$H_{C2} > (\sigma_w/2M_{S2}t_2) \quad \text{Formula 44}$$

$$H_{C2} + (\sigma_w/2M_{S2}t_2) < |Hini.| < H_{C1} - (\sigma_w/2M_{S1}t_1) \quad \text{Formula 45:}$$

The layer 2's magnetization of the recording medium which can satisfy Formulas 42 to 44 at the $T_R$ is aligned along the "A direction" ⇩ ( ↓ ↑ ) by the Hini. which satisfies Formula 45. At this time, the recording layer 1 is maintained in the recorded state (Condition 1 in FIGS. 32 and 33).

Condition 1 is held to a point immediately before the recording. In this case, the base field (Hb) is applied in the direction of ↓.

The high-temperature cycle will now be described with reference to FIG. 32.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation continues and the medium temperature is equal to the temperature $T_H$, since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization ⇕ ( ↑ ↓ ) is generated by ↓ Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 ( ↑ ↓ ) acts to align each of the RE and TM spins ( ↑ and ↓ ) of the layers 1 and 2. For this reason, magnetization ↑ ↓ , i.e., ⇕ appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "non-A direction" ⇕ is completed.

Next, the low-temperature cycle will be described with reference to FIG. 33.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. In this state, however, since the coersivity $H_{C2}$ of the layer 2 is sufficiently high, magnetization ⇕ of the layer 2 will not be reversed by the bias field ↓ Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the recording layer 1 are influenced by the RE and TM spins ( ↓ ↑ ) of the reference layer 2 due to the exchange coupling force. In other words, the exchange coupling force acts to align each of the RE and TM spins ( ↓ and ↑ ) of the layers 1 and 2. As a result, magnetization of ↓ ↑ , i.e., ⇕ , without regard to the bias field ↓ Hb, appears in the layer 1. This state is Condition $3_L$.

Condition $3_L$ is maintained even if the medium temperature is decreased to the room temperature. In this way, bit formation in the "A direction" ⇕ is completed.

The principle of the method of the present invention will be described in detail using a specific medium No. 8 belonging to Class 8 (A type, Quadrant IV, Type 2) shown in Table 1.

The medium No. 8 satisfies Formula 46:

$$T_R < T_{C1} \approx T_L \approx T_{comp.2} < T_{C2} \approx T_H$$

The graph of FIG. 34 shows this relation.

A condition that reverses the direction of magnetization of the reference layer 2 without reversing that of the recording layer 1 by the initial field (Hini.) at the room temperature $T_R$ is represented by Formula 47. The medium No. 8 satisfies Formula 47 at the $T_R$:

$$H_{C1} > H_{C2} + |(\sigma_w/2M_{S1}t_1) - (\sigma_w/2M_{S2}t_2)|$$

where
$H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 50. If the Hini. disappears, reversed magnetization of the reference layer 2 is influenced by magnetization of the recording layer 1 due to an exchange coupling force. The condition that can hold the direction of magnetization of the layer 2 is represented by Formulas 48 and 49. The medium No. 8 satisfies Formulas 48 and 49.

$$H_{C1} > (\sigma_w/2M_{S1}t_1) \qquad \text{Formula 48}$$

$$H_{C2} > (\sigma_w/2M_{S2}t_2) \qquad \text{Formula 49}$$

$$H_{C2} + (\sigma_w/2M_{S2}t_2) < |Hini.| < H_{C1} + (\sigma_w/2M_{S1}t) \qquad \text{Formula 50}$$

The layer 2's magnetization of the recording medium which can satisfy Formulas 47 to 49 at the $T_R$ is aligned along the "A direction" ⇕ ( ↑ ↓ ) by the Hini. Which satisfies Formula 50. At this time the recording layer 1 is maintained in the recorded state (Condition 1 in FIGS. 35 and 36).

Condition 1 is held to a point immediately before the recording. In this case, the bias field (Hb) is applied in the direction of ↑.

The high-temperature cycle will now be described with reference to FIG. 35.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation continues and the medium temperature is slightly higher than the temperature Tcomp.2, the relationship between the strengths of the RE and TM spins is reversed although the directions thereof ( ↑ and ↓ ) remain the same. As a result, the direction of the magnetization of the layer 2 is reversed to "non-A direction" ⇕ . This state is Condition $3_H$.

At this temperature, however, since the coersivity $H_{C2}$ is yet high, magnetization ⇕ of the layer 2 will not be reversed by the bias field ↑ Hb. Assume that the laser-beam radiation further continues and the medium temperature is increased to $T_H$. Since the temperature $T_H$ is substantially equal to the temperature $T_{C2}$, magnetization of the layer 2 also disappears (Condition $4_H$).

In Condition $4_H$ when an irradiated portion is separated from the laser beam spot, the temperature of the medium begins to decrease. When the temperature of the medium decreases slightly below the temperature $T_{C2}$, magnetization of the layer 2 appears. In this case, magnetization ⇕ ( ↓ ↑ ) is generated by ↑ Hb. However, since the temperature is yet higher than the temperature $T_{C1}$, no magnetization appears in the layer 1. This state is Condition $5_H$.

When the temperature of the medium is further decreased slightly below the temperature Tcomp. 1, the relationship between the strengths of the RE and TM spins is reversed ($\downarrow \uparrow \rightarrow \downarrow \uparrow$) without reversing the directions thereof ($\downarrow$ and $\uparrow$). As a result the direction of magnetization of the layer 2 is reversed to "non-A direction" ◊. In this state, since the coersivity $H_{C2}$ is already sufficiently high, magnetization ◊ of the layer 2 will not be reversed by the bias field $\uparrow$ Hb. In this case, since the medium temperature is yet higher than the temperature $T_{C1}$, no magnetization appears in the layer 1. This state is Condition $6_H$.

When the medium temperature further decreases slightly below the temperature $T_{C1}$, magnetization also appears in the layer 1. At this time, magnetization ($\downarrow \uparrow$) of the layer 1 influences the layer 1 due to the exchange coupling force to align each of the RE and TM spins ($\downarrow$ and $\uparrow$) of the layers 1 and 2. For this reason, magnetization $\downarrow \uparrow$, i.e., ◊ appears in the layer 1 (Condition $7_H$).

Then, the temperature of the medium decreases from the temperature in Condition $7_H$ to the room temperature. Since the coersivity $H_{C1}$ at the room temperature is sufficiently high, magnetization of the layer 1 is stably maintained. In this way, bit formation in the "A direction" ◊ is completed.

Next, the low-temperature cycle will be described with reference to FIG. 36.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. In this state, however, since the coersivity $H_{C2}$ of the layer 2 is sufficiently high, magnetization of the layer 2 will not be reversed by the bias field $\uparrow$ Hb (Condition $2_L$).

In Condition $2_L$, when an irradiated portion is separated from the laser beam spot, the medium temperature begins to fall. When the medium temperature begins to fall. When the medium temperature is slightly below the temperature $T_{C1}$, the respective spins of the recording layer 1 are influenced by the RE and TM spins ($\uparrow \downarrow$) of the reference layer 2 due to the exchange coupling force. In other words, the exchange coupling force acts to align each of the RE and TM spins ($\uparrow$ and $\downarrow$) of the layers 1 and 2. As a result, magnetization of $\uparrow \downarrow$, i.e., ◊, without regard to the bias field $\uparrow$ Hb, appears in the layer 1. This state is Condition $3_L$. Condition $3_L$ is maintained even if the medium temperature is decreased to the room temperature. In this way, bit formation in the "non-A direction" ◊ is completed.

The principle of the method of the present invention will be described in detail using a specific medium No. 9 belonging to Class 9 (A type, Quadrant IV, Type 4) shown in Table 1.

The medium No. 9 satisfies Formula 51:

$$T_R < T_{C1} \approx T_L < T_{C2} \approx T_H$$

The graph of FIG. 37 shows this relation.

A condition that reverses the direction of magnetization of the reference layer 2 without reversing that of the recording layer 1 by the initial field (Hini.) at the room temperature $T_R$ is represented by Formula 52. The medium No. 9 satisfies Formula 52 at the $T_R$:

$$H_{C1} > H_{C2} + |(\sigma_w/2M_{S1}t_1) - (\sigma_w/2M_{S2}t_2)|$$

where $H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 50. If the Hini. disappears, reversed magnetization of the reference layer 2 is influenced by magnetization of the recording layer 1 due to an exchange coupling force. The condition that can hold the direction of magnetization of the layer 2 is represented by Formulas 53 and 54. The medium No. 9 satisfies Formulas 53 and 54.

$$H_{C1} > (\sigma_w/2M_{S1}t_1) \quad \text{Formula 53}$$

$$H_{C2} > (\sigma_w/2M_{S2}t_2) \quad \text{Formula 54}$$

$$H_{C2} + (\sigma_w/2M_{S2}t_2) < |Hini.| < H_{C1} + (\sigma_w/2M_{S1}t_1) \quad \text{Formula 55}$$

The layer 2's magnetization of the recording medium which can satisfy Formulas 52 to 54 at the $T_R$ is aligned along the "A direction" ◊ ($\uparrow \downarrow$) by the Hini. which satisfies Formula 55. At this time, the recording layer 1 is maintained in the recorded state (Condition 1 in FIGS. 38 and 39).

Condition 1 is held to a point immediately before the recording. In this case, the bias field (Hb) is applied in the direction of $\downarrow$.

The high-temperature cycle will now be described with reference to FIG. 38.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation continues and the medium temperature is equal to the temperature $T_H$, the temperature $T_H$ is substantially equal to the temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization ◊ ($\downarrow \uparrow$) is generated by $\downarrow$ Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 ($\downarrow \uparrow$) acts to align each of the RE and TM spins ($\downarrow$ and $\uparrow$) of the layers 1 and 2. For this reason, magnetization $\downarrow \uparrow$, i.e., ◊, without regard to the bias field $\downarrow$ Hb, appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "A direction" ◊ is completed.

Next, the low-temperature cycle will be described with reference to FIG. 39.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears. In this state, however, since the coersivity $H_{C2}$ of the layer 2 is sufficiently high, magnetization ↓ of the layer 2 will not be reversed by the bias field ↓ Hb. This state is Condition $2_L$.

In Condition $2_L$, when an irradiated portion is separated from the laser beam spot, the medium temperature begins to fall. When the medium temperature is slightly below the temperature $T_{C1}$, the recording layer 1 is influenced by the RE and TM spins ( ↑ ↓ ) of the reference layer 2 due to the exchange coupling force. In other words, the exchange coupling force acts to align each of the RE and TM spins ( ↑ and ↓ ) of the layers 1 and 2. As a result, magnetization of ↑ ↓, i.e., ↓, appears in the layer 1. This state is Condition $3_L$.

Condition $3_L$ is maintained even if the medium temperature is decreased to the room temperature. In this way, bit formation in the "non-A direction" ↓ is completed.

According to the present invention as described above, for the first time, an over-write operation is allowed without turning on or off the bias field Hb or without changing the direction of the bias field Hb.

BRIEF DESCRIPTION OF THE DRAWINGS

FIG. 3 is a diagram showing the overall arrangement of a magnetooptical recording apparatus according to Example 10 of the present invention;

FIG. 4 is a diagram showing the overall arrangement of a magnetooptical recording apparatus according to Examples 11 and 12 of the present invention;

FIG. 7A is a diagram of a multilayered structure of a recording medium according to the embodiment of the present invention;

FIG. 7B is a diagram showing the direction of magnetization of a recording layer and a reference layer;

FIG. 8 illustrate changes in the direction of magnetization at high level;

FIG. 9 illustrates changes in the direction of magnetization at low level;

FIG. 10 illustrates flows of the changes in the direction of magnetization shown in FIGS. 8 and 9 for respective P- and A-type media;

FIGS. 14 and 15 are diagrams showing changes in the direction of magnetization in high- and low-temperature cycles of a medium No. 1;

FIGS. 17 and 18 are diagrams showing the changes in the direction of magnetization in high- and low-temperature cycles of a medium No. 2;

FIGS. 23 and 24 are diagrams showing the changes in the direction of magnetization in high- and low-temperature cycles of the medium No. 4;

FIGS. 29 and 30 are diagrams showing the changes in the direction of magnetization in high- and low-temperature cycles of the medium No. 6;

FIGS. 32 and 33 are diagrams showing the changes in the direction of magnetization in high- and low-temperature cycles of the medium No. 7;

FIGS. 38 and 39 are diagrams showing the changes in the direction of magnetization in high- and low-temperature cycles of the medium No. 9;

FIG. 40 is a schematic view showing a vertical section of a recording medium with a third layer (transcription layer); and FIG. 41 is a diagram showing the overall arrangement of a reproduction apparatus according to Example 40 of the present invention.

DETAILED DESCRIPTION OF THE PREFERRED EMBODIMENTS

Figure 1:
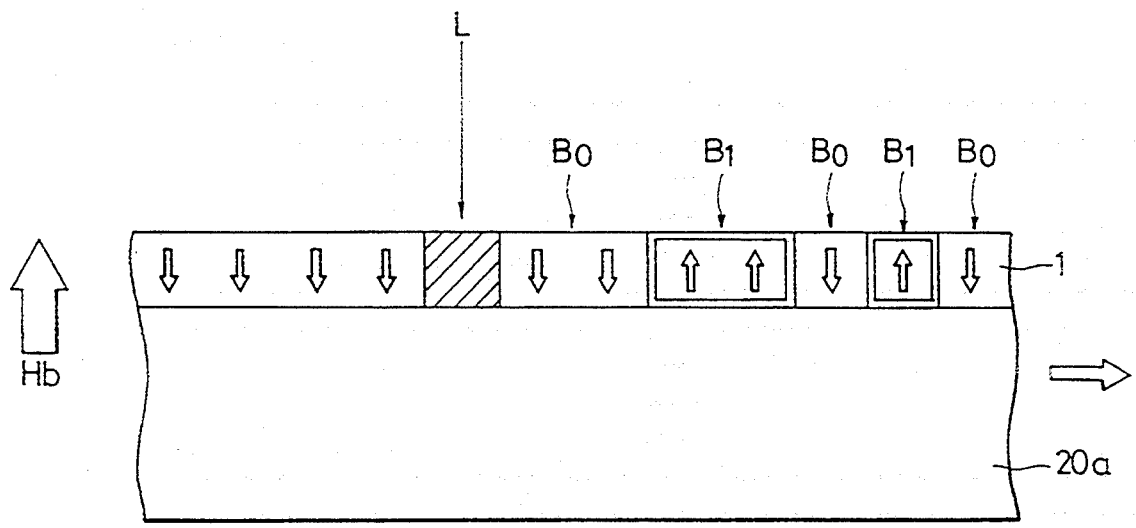
FIG. 1 is an illustration for explaining a recording principle of a magnetooptical recording method.
Figure 2:
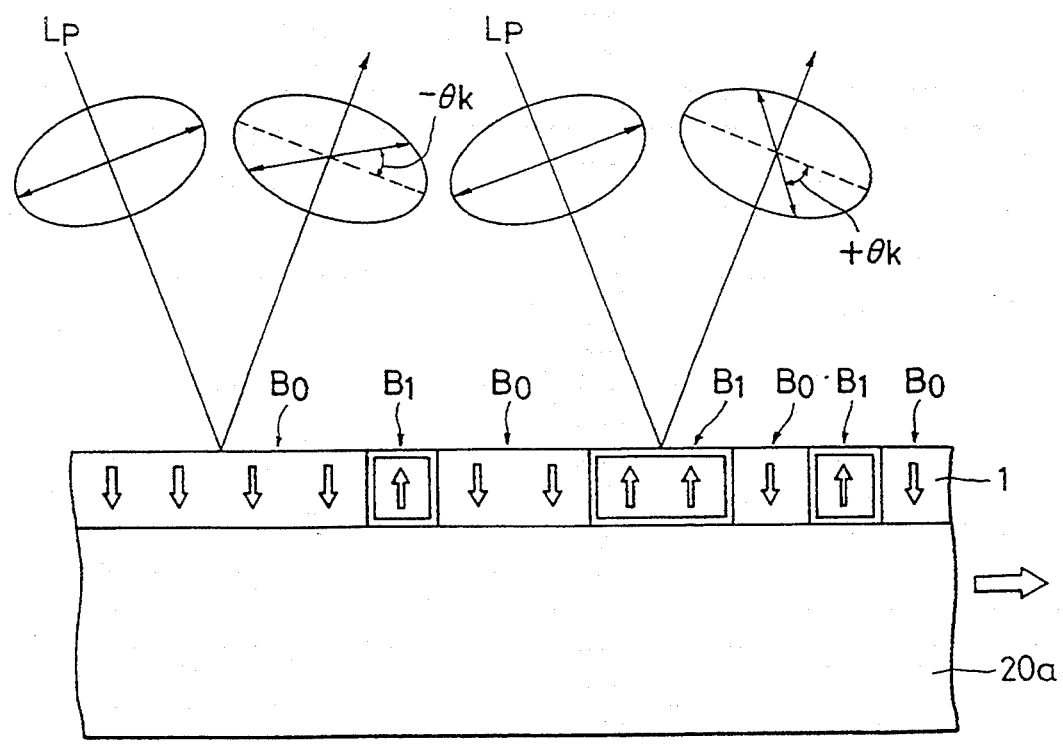
FIG. 2 is an illustration for explaining a reading principle of the magnetooptical recording method.
Figure 5:
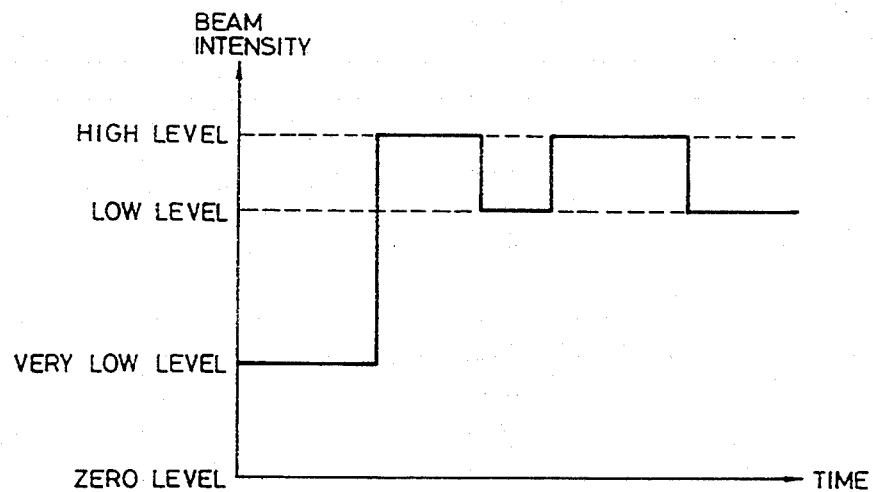
FIG. 5 is a chart showing an output waveform according to an embodiment of the present invention.
Figure 6:
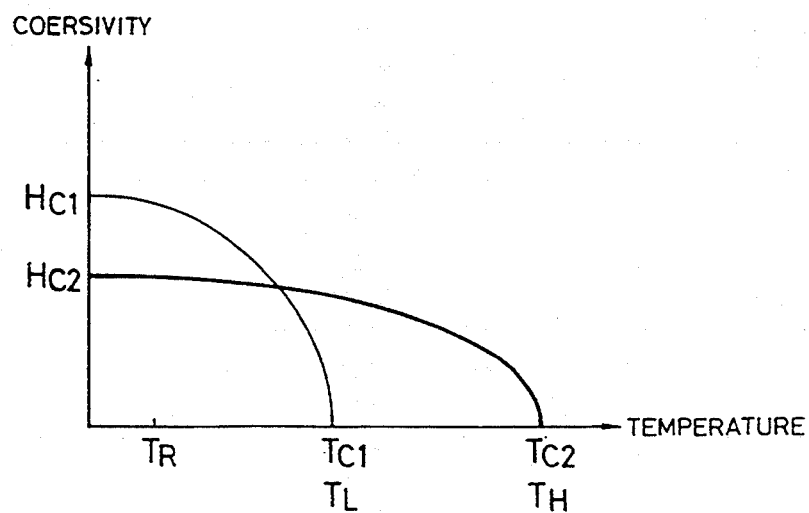
FIG. 6 is a graph showing the relationship between coersivity and temperature.
Figure 11:
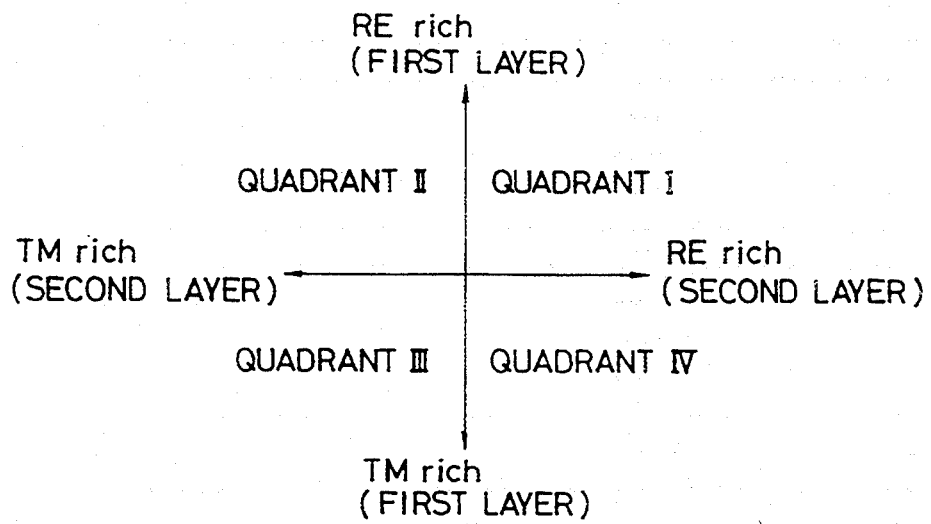
FIG. 11 is a map wherein the types of media of the present invention as classified into four quadrants.
Figure 13:
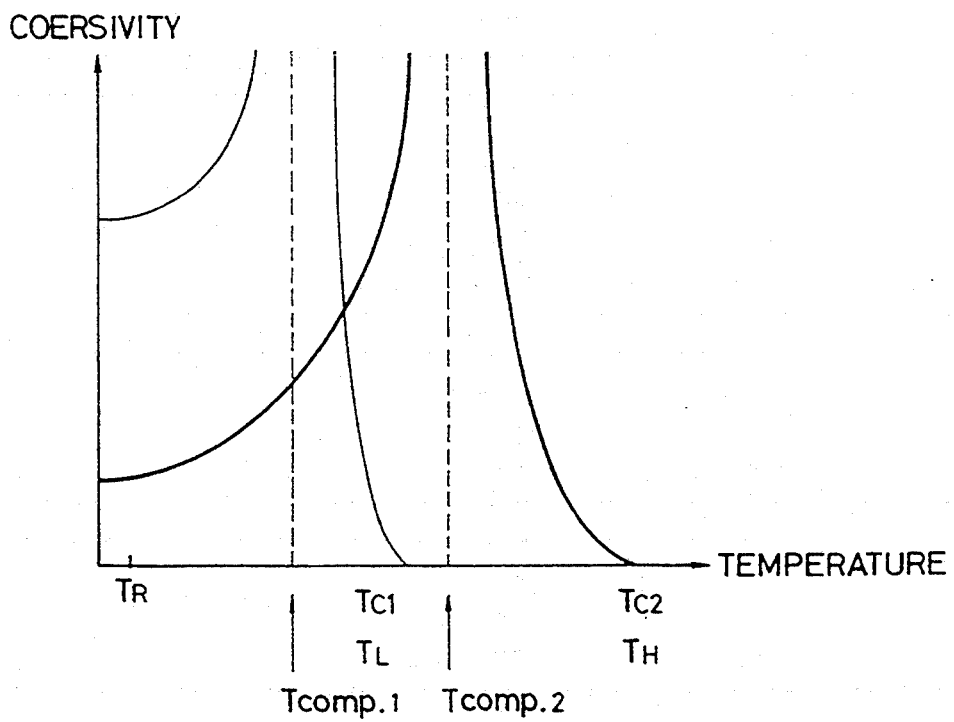
FIG. 13 is a graph showing the relationship between the coersivity and the temperature for a medium No. 1.
Figure 12A:
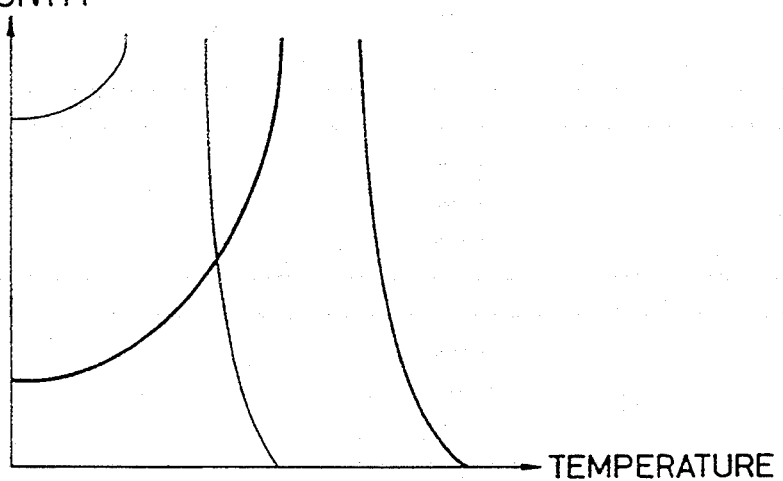
FIGS. 12A to 12D are graphs showing the relationship between the coersivity and the temperature respectively for media of Types I to IV.
Figure 12B:
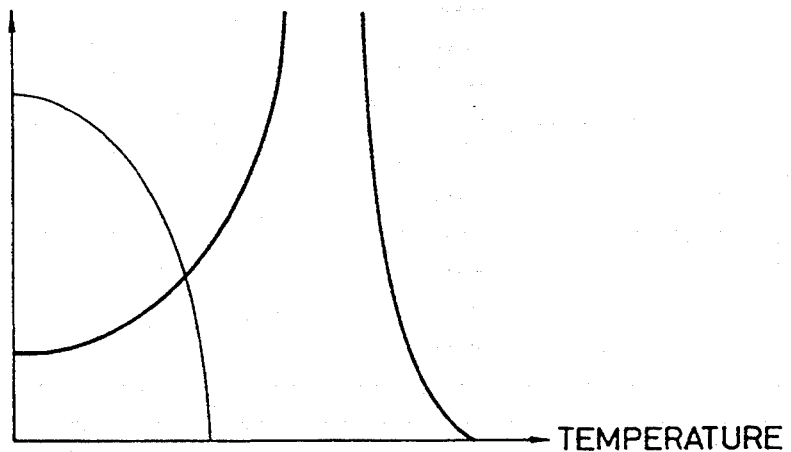
Figure 12C:
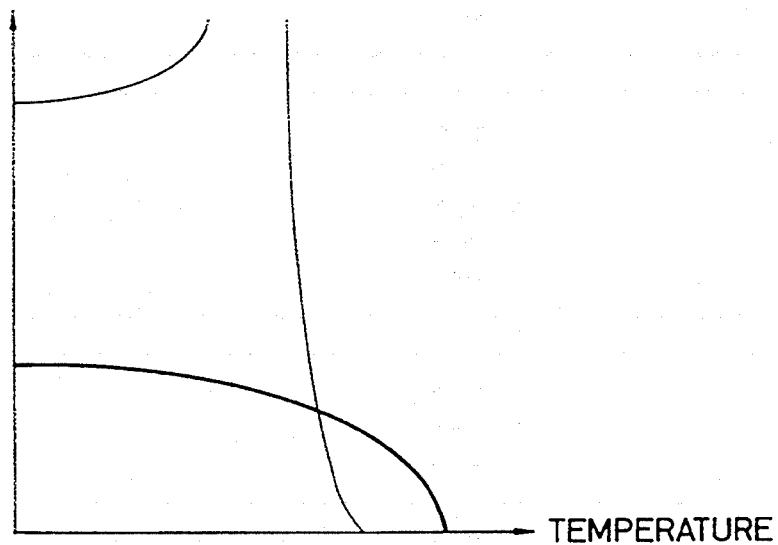
Figure 12D:
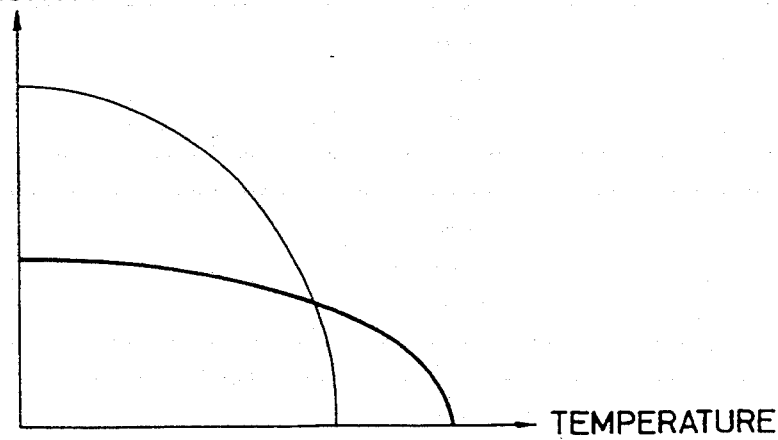
Figure 16:
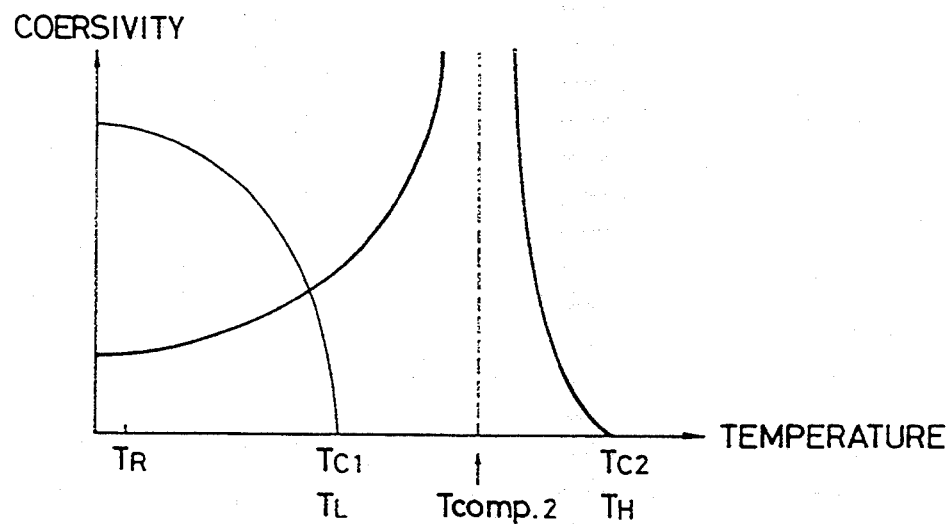
FIG. 16 is a graph showing the relationship between the coersivity and the temperature for the medium No. 2.
Figure 19:
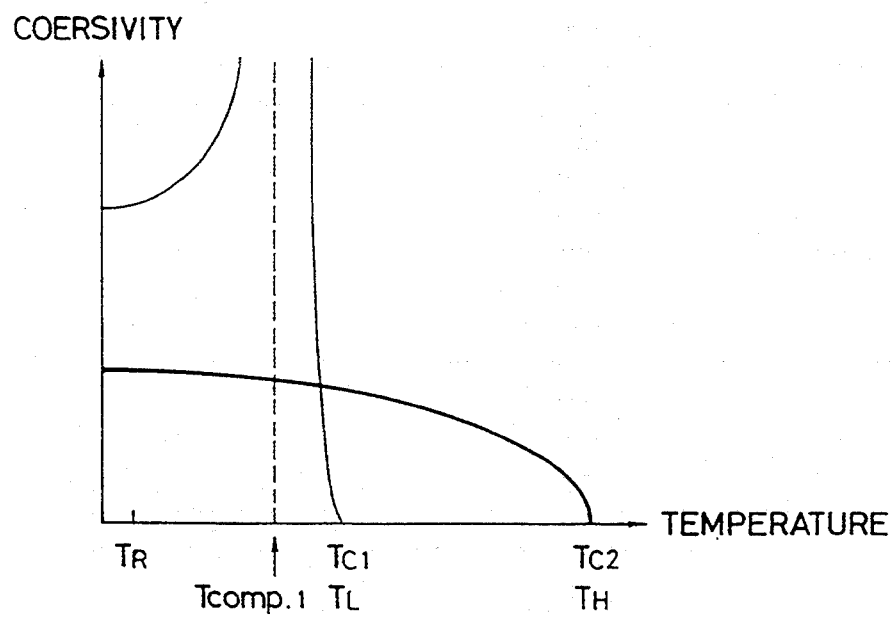
FIG. 19 is a graph showing the relationship between the coersivity and the temperature for a medium No. 3.
Figure 20:
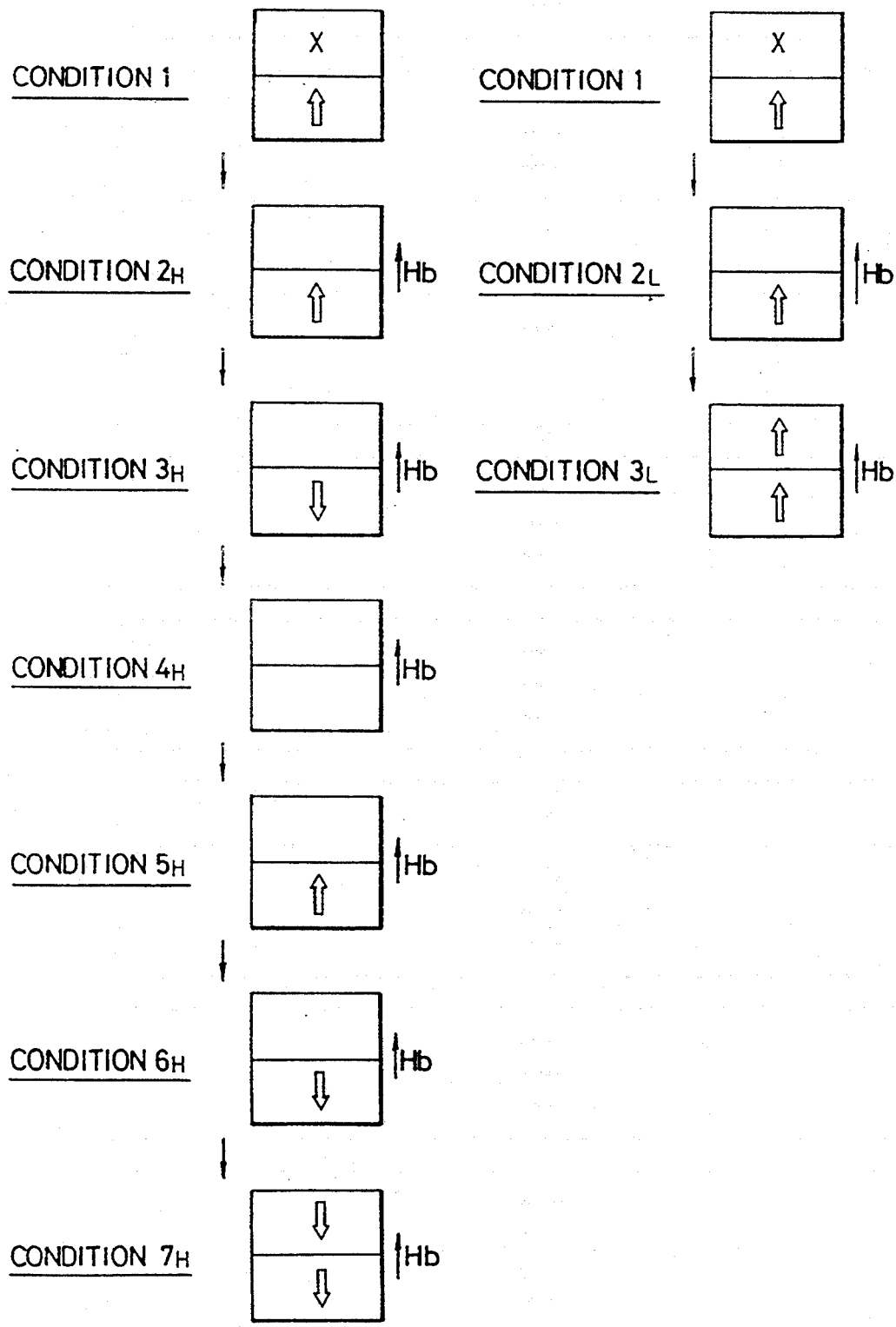
FIGS. 20 and 21 are diagrams showing the changes in the direction of magnetization in high- and low-temperature cycles of the medium No. 3.
Figure 21:
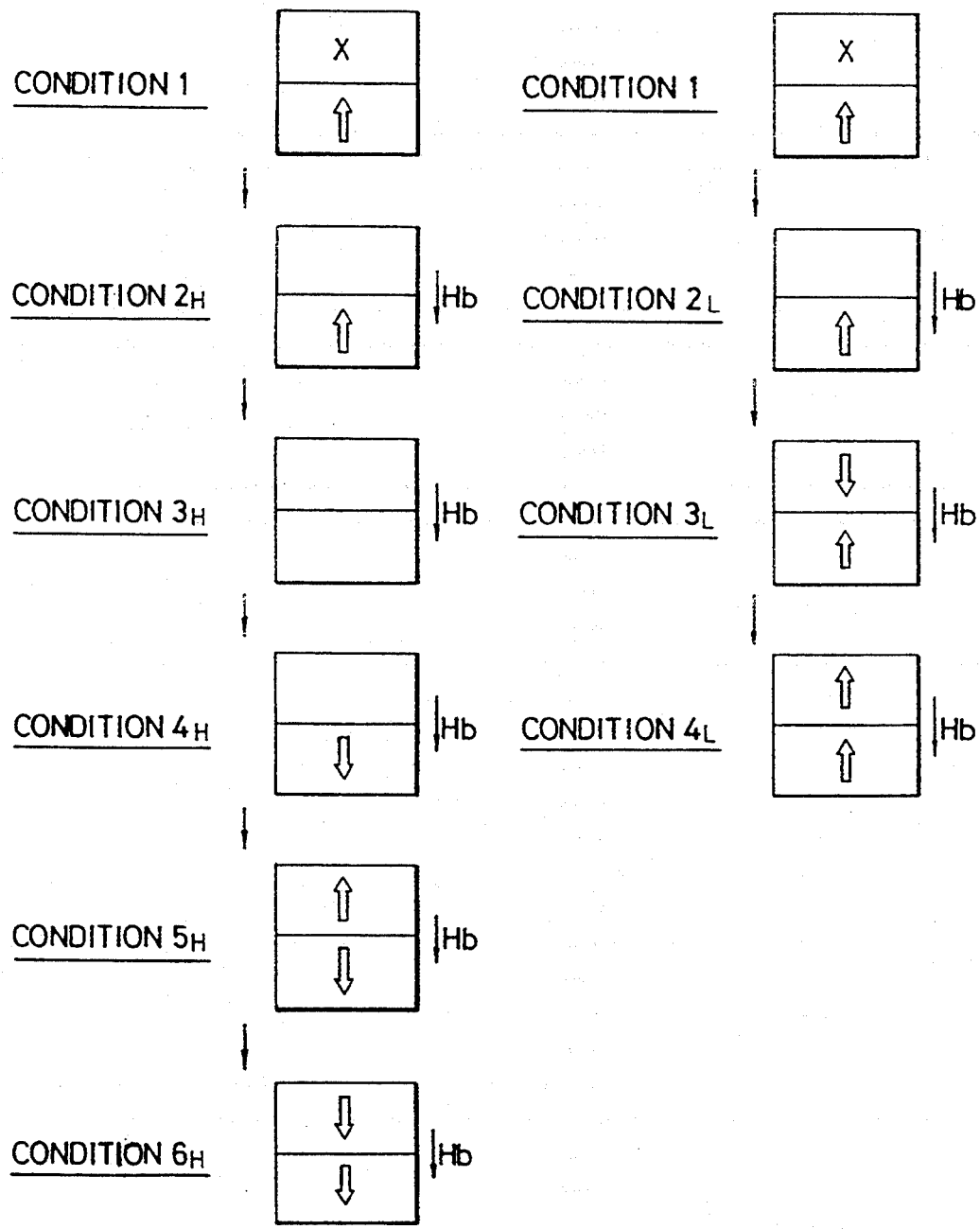
Figure 22:
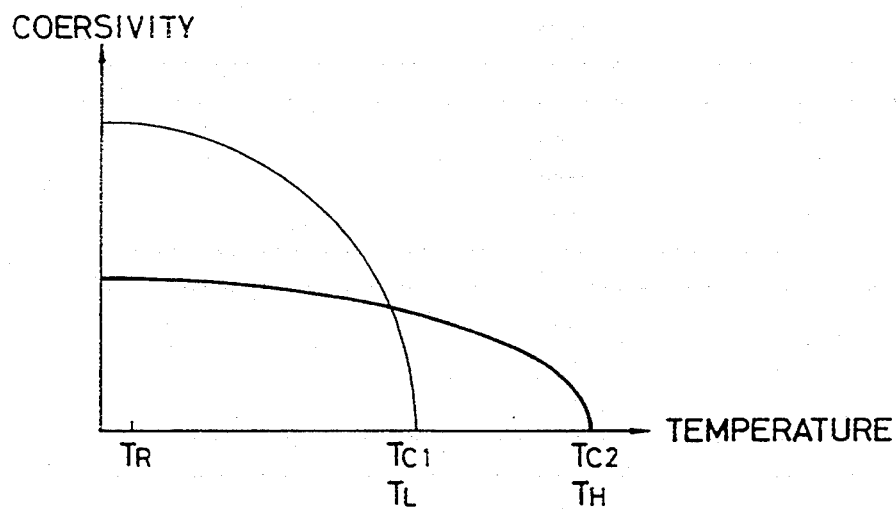
FIG. 22 is a graph showing the relationship between the coersivity and the temperature for a medium No. 4.
Figure 25:
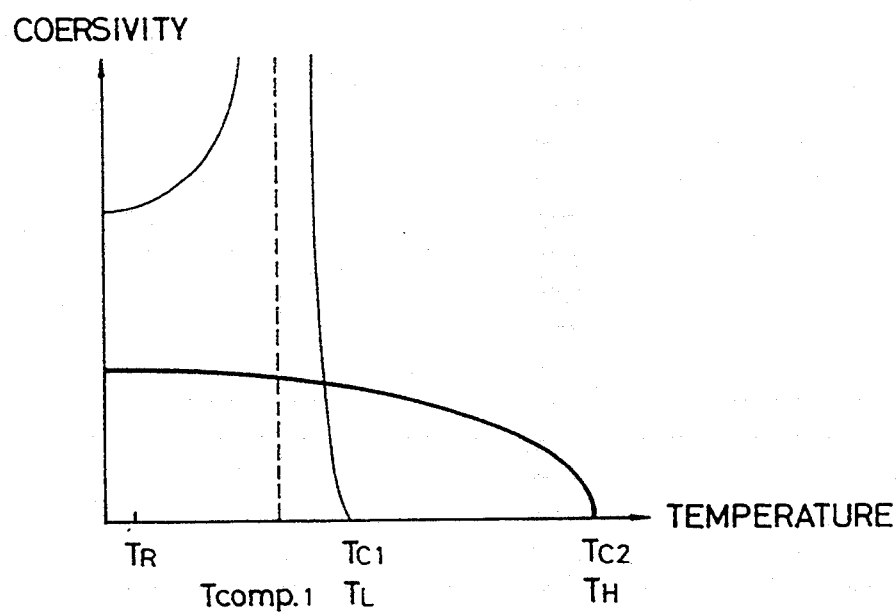
FIG. 25 is a graph showing the relationship between the coersivity and the temperature for a medium No. 5.
Figure 26:
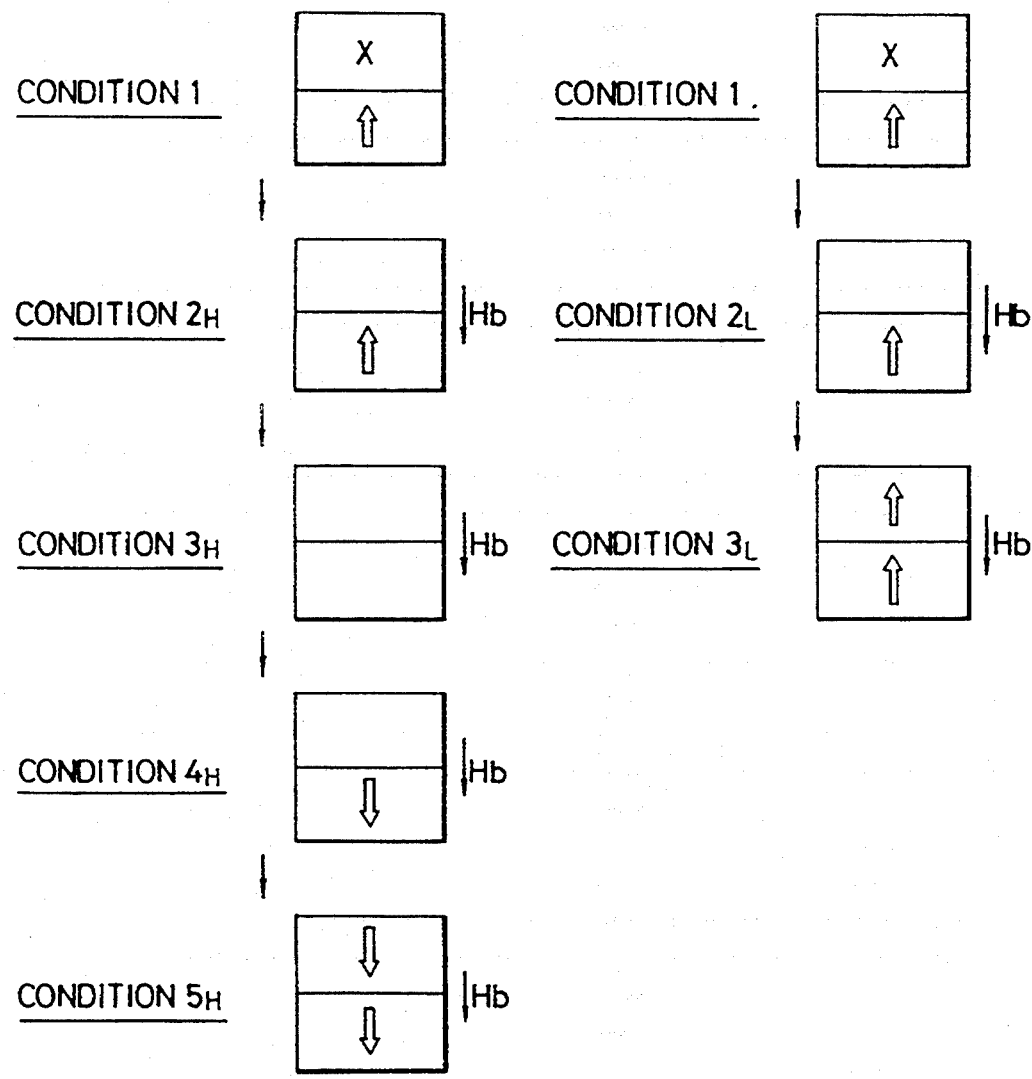
FIGS. 26 and 27 are diagrams showing the changes in the direction of magnetization in high- and low-temperature cycles of the medium No. 5.
Figure 27:
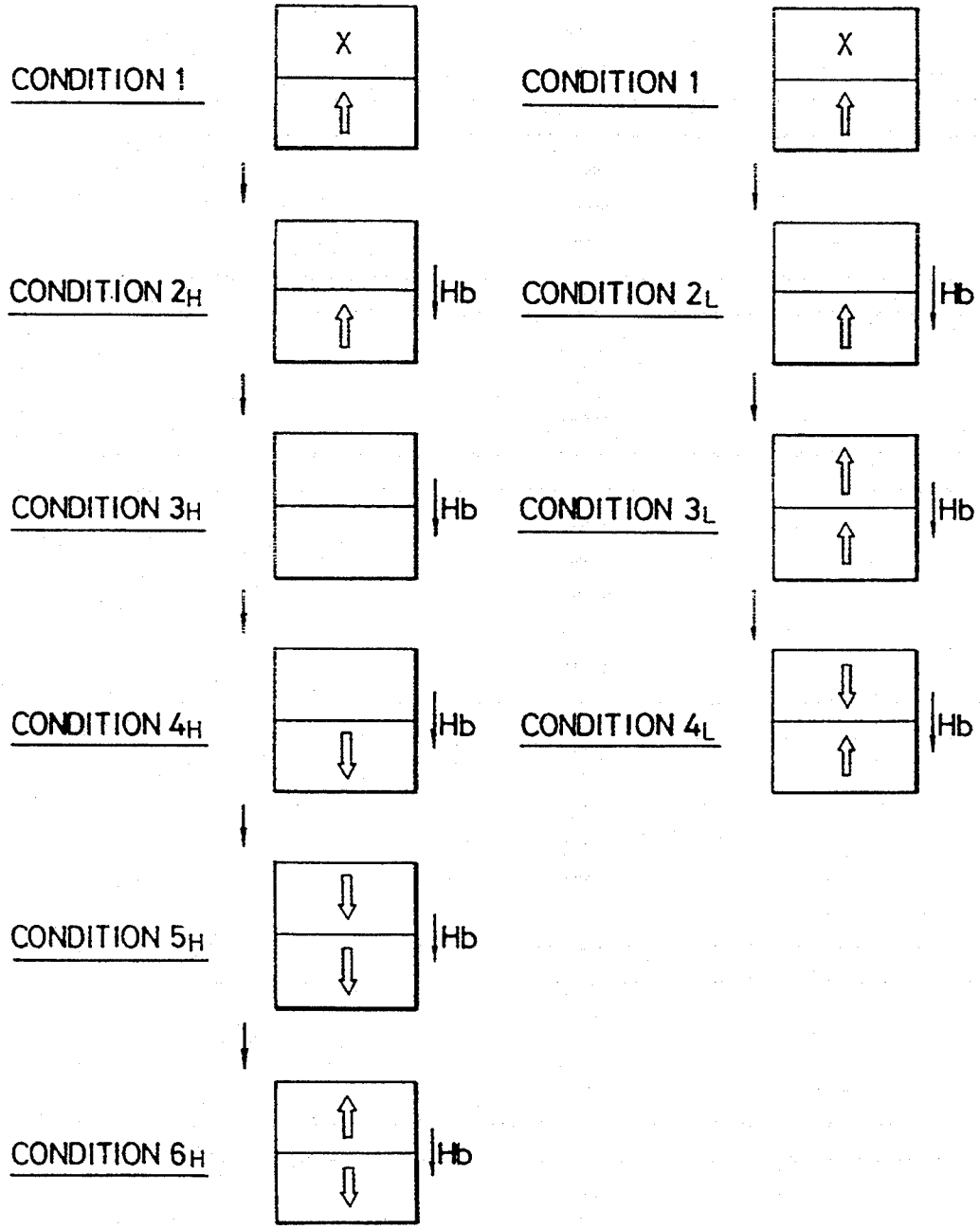
Figure 28:
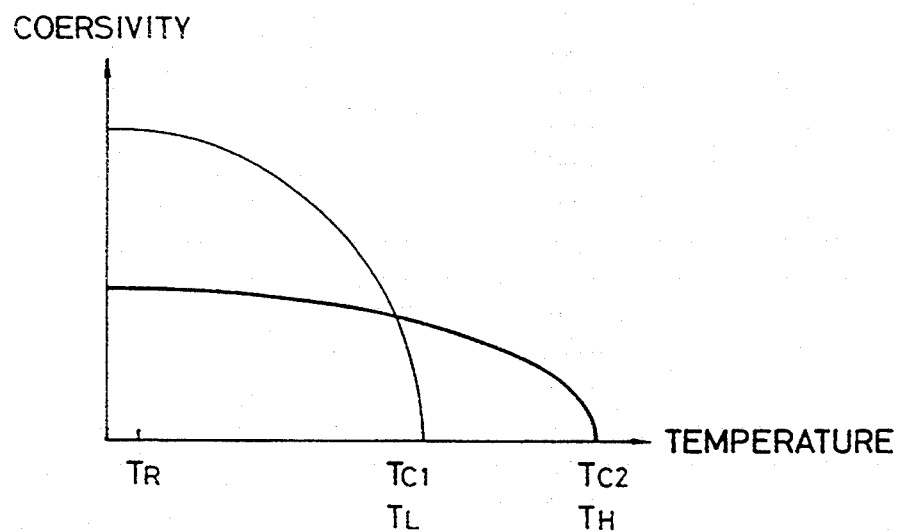
FIG. 28 is a graph showing the relationship between the coersivity and the temperature for a medium No. 6.
Figure 31:
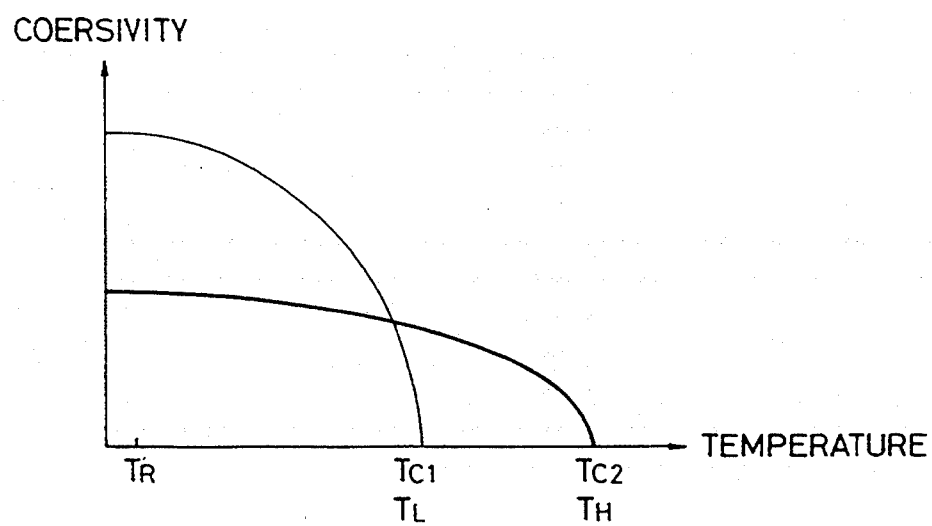
FIG. 31 is a graph showing the relationship between the coersivity and the temperature for a medium No. 7.
Figure 34:
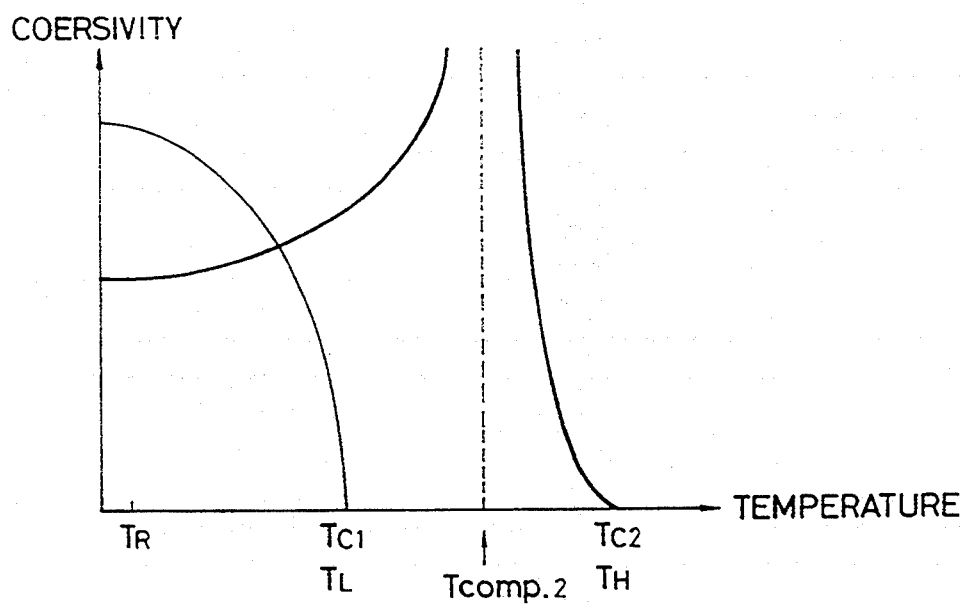
FIG. 34 is a graph showing the relationship between the coersivity and the temperature for a medium No. 8.
Figure 37:
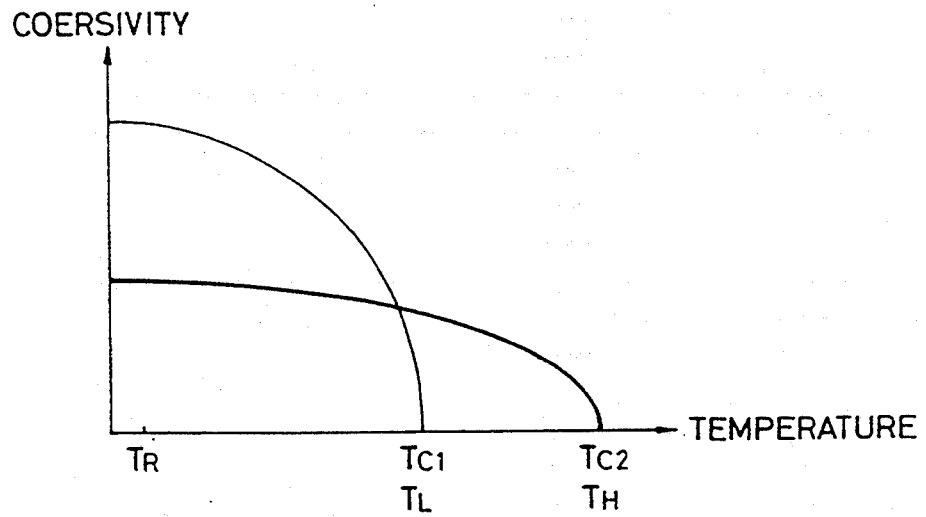
FIG. 37 is a graph showing the relationship between the coersivity and the temperature for a medium No. 9.
Figure 35:
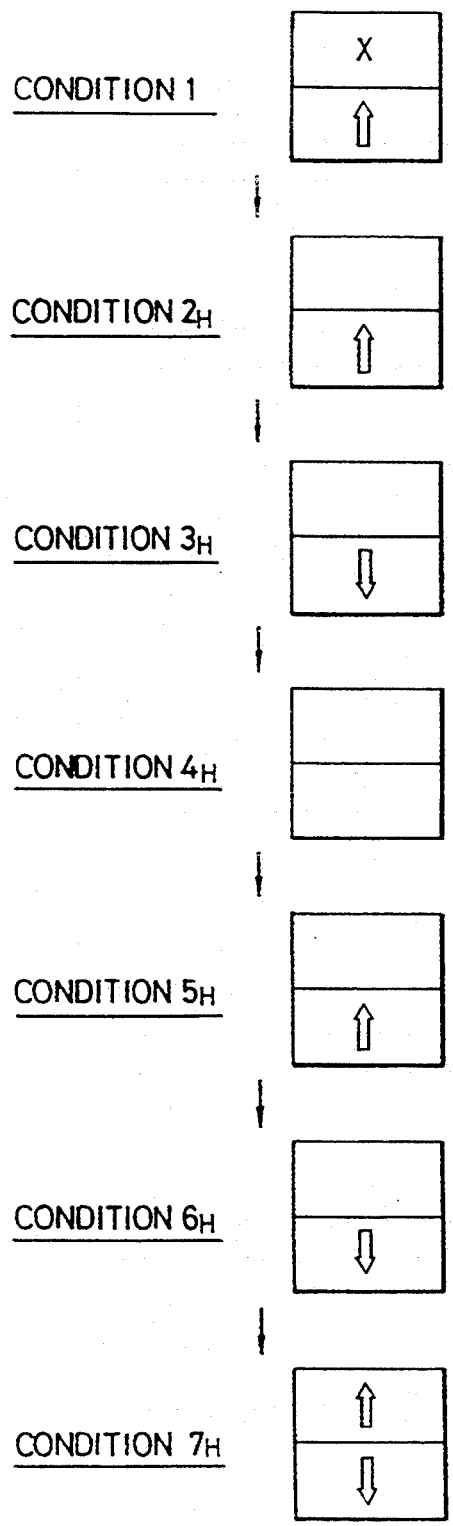
FIGS. 35 and 36 are diagrams showing the changes in the direction of magnetization in high- and low-temperature cycles of the medium No. 8.
Figure 36:
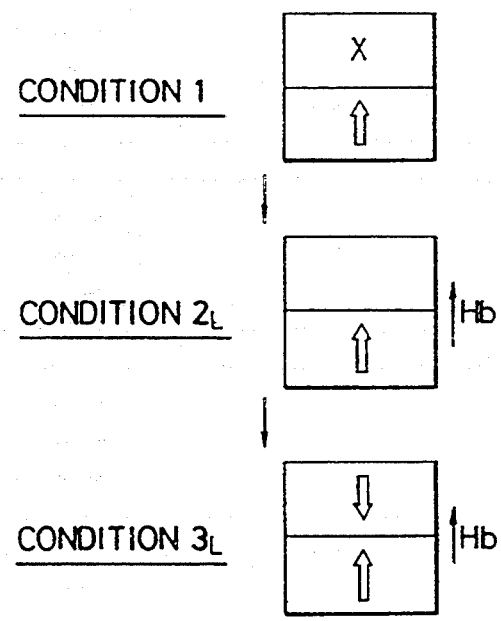

The present invention will now be described by way of examples. However, the present invention is not limited to the following examples.

(Example 1 . . . One of Media No. 1)

A vacuum vapor deposition apparatus was used in this example. It included two crucibles as evaporation sources shown in Table 2 and two units for heating the respective sources with an electron beam.

A 1.2-mm thick, 200-mm diameter glass substrate was placed inside a chamber of the apparatus. The chamber of the apparatus was temporarily evacuated to a vacuum of $1 \times 10^{-6}$ Torr. or less. Thereafter, deposition was performed at a deposition rate of about 3 Å/sec while maintaining the chamber at a vacuum of 1 to $2 \times 10^{-6}$ Torr. Then, a 1,000-Å first layer (recording layer) of $Gd_{14}Gy_{12}Fe_{74}$ (note: appendixes, atom.%) was formed on the substrate. Subsequently, the evaporation sources were exchanged while maintaining the vacuum state. Then, deposition was performed again to form a 2,000-Å thick second layer (reference layer) of $Gd_{24}Tb_3Fe_{73}$.

The first and second layers were perpendicular magnetic layers.

In this way, a double-layered recording medium No. 1 belonging to Class 1 (i.e., P-type, Quadrant I, and Type 1) was manufactured.

Table 2 below shows the manufacturing conditions and characteristics of the medium No. 1.

TABLE 2

|  | Recording Layer 1 | Reference Layer 2 |
| --- | --- | --- |
| Evaporation Source | GdDy alloy | GdTb alloy |
| (2 Elements) | Fe | Fe |
| Film Thickness (Å) | 1000 | 2000 |
| Ms (emu/cc) | 100 | 170 |
| Hc (Oe) | 5600 | 350 |
| Tc (°C.) | 150 | 210 |
| Tcomp. (°C.) | 110 | 170 |
| $\sigma_w$ (Room Temperature) | 0.8 erg/cm² | |

If $T_L = 170°$ C. and $T_H = 230°$ C. (see Example 13), this medium satisfies:

$$T_R < Tcomp.1 < T_{C1} \approx T_L \approx Tcomp.2 < T_{C2} \approx T_H \quad \text{Formula 11}$$

and $$H_{C1} = 5,600 O\text{-}e > H_{C2} + (\sigma_w/2M_{S1}t_1) + (\sigma_w/2M_{S2}t_2) = 868 Oe \quad \text{Formula 12}$$

In Formula 15, since $$H_{C1} - (\sigma_w/2M_{S1}t_1) = 5,100 Oe$$

$$H_{C2} + (\sigma_w/2M_{S2}t_2) = 468 Oe$$

if an initial field (Hini.) is 600 Oe, the medium No. 1 can satisfy Formula 15. Thus, the direction of magnetization of the reference layer 2 is reversed at the room temperature due to the initial field (Hini.) without reversing that of the recording layer 1.

In addition, since the medium No. 1 satisfies:

$$H_{C1} = 5,600 Oe > (\sigma_w/2M_{S1}t_1) = 400 Oe \quad \text{Formula 13}$$

and $$H_{C2} = 350 Oe > (\sigma_w/2M_{S2}t_2) = 118 Oe \quad \text{Formula 14}$$

if the initial field (Hini.) is removed, magnetization of the layers 1 and 2 can be maintained.

Therefore, when the initial field (Hini.)=600 Oe is applied in the "A direction" (↑) and the bias field Hb=600 Oe is applied in the "A direction" (↑), an over-write operation is enabled. Note that since the levels and the directions of the fields Hb and Hini. are equal to each other, the recording apparatus which uses a single applying means for applying both the fields Hb and Hini. can be used.

(Example 2 ... One of Media No. 2)

A 500-Å thick first layer (recording layer) of $Tb_{27}Fe_{73}$ and a 2,000-Å thick second layer (reference layer) of $Gd_{24}Tb_3Fe_{73}$ were sequentially formed on a substrate in the same manner as in Example 1. Then, a medium No. 2 belonging to Class 2 (i.e., P type, Quadrant I, and Type 2) was manufactured.

Table 3 below shows the manufacturing conditions and characteristics of the medium No. 2.

TABLE 3

|  | Recording Layer 1 | Reference Layer 2 |
| --- | --- | --- |
| Evaporation Source | Tb | GdTb alloy |
| (2 Elements) | Fe | Fe |
| Film Thickness t(Å) | 500 | 2000 |
| Ms (emu/cc) | 120 | 170 |
| Hc (Oe) | 7000 | 350 |
| Tc (°C.) | 135 | 210 |
| Tcomp. (°C.) | None | 170 |
| $\sigma_w$ (Room Temperature) | 1.0 erg/cm² | |

If $T_L = 150°$ C. and $T_H = 230°$ C. (see Example 14), this medium satisfies:

$$T_R < T_{C1} \approx T_L \approx Tcomp.2 < T_{C2} \approx T_H \quad \text{Formula 16}$$

and $$H_{C1} = 7,000 O\text{-}e > H_{C2} + (\sigma_w/2M_{S1}t_1) + (\sigma_w/2M_{S2}t_2) = 1,330 Oe \quad \text{Formula 17}$$

In Formula 20, since $$H_{C1} - (\sigma_w/2M_{S1}t_1) = 6,167 Oe$$

$$H_{C2} + (\sigma_w/2M_{S2}t_2) = 497 Oe$$

if an initial field (Hini.) is 600 Oe, the medium No. 2 can satisfy Formula 20. Thus, the direction of magnetization of the reference layer 2 is reversed at the room temperature due to the initial field (Hini.) without reversing that of the recording layer 1.

In addition, since the medium No. 2 satisfies:

$$H_{C1} = 7,000 Oe > (\sigma_w/2M_{S1}t_1) = 833 Oe \quad \text{Formula 18}$$

and $$H_{C2} = 350 Oe > (\sigma_w/2M_{S2}t_2) = 147 Oe \quad \text{Formula 19}$$

if the initial field (Hini.) is removed, magnetization of the layers 1 and 2 can be maintained.

Therefore, when the initial field (Hini.)=600 Oe is applied in the "A direction" (↑) and the bias field Hb=600 Oe is applied in the "A direction" (↑), an over-write operation is enabled. Note that since the levels and the directions of the fields Hb and Hini. are equal to each other, the recording apparatus which uses a single applying means for applying both the fields Hb and Hini. can be used.

(Example 3 ... One of Media No. 3)

A 500-Å thick first layer (recording layer) of $Gd_{23}Tb_3Fe_{74}$ and a 1,000-Å thick second layer (reference layer) of $Tb_{28}Fe_{65}Co_7$ were sequentially formed on a substrate in the same manner as in Example 1. Then, a medium No. 3 belonging to Class 3 (i.e., P type, Quadrant I, and Type 3) was manufactured.

Table 4 below shows the manufacturing conditions and characteristics of the medium No. 3.

TABLE 4

|  | Recording Layer 1 | Reference Layer 2 |
| --- | --- | --- |
| Evaporation Source | GdTb alloy | Tb |
| (2 Elements) | Fe | FeCo alloy |
| Film Thickness t(Å) | 500 | 1000 |

TABLE 4-continued

|  | Recording Layer 1 | Reference Layer 2 |
|---|---|---|
| Ms (emu/cc) | 90 | 180 |
| Hc (Oe) | 8000 | 3000 |
| Tc (°C.) | 150 | 200 |
| Tcomp. (°C.) | 120 | None |
| $\sigma_w$ (Room Temperature) | 1.0 erg/cm² | |

If $T_L = 170°$ C. and $T_H = 220°$ C. (see Example 15), this medium satisfies:

$$T_R < Tcomp.1 < T_{C1} \approx T_L < T_{C2} \approx T_H \qquad \text{Formula 21}$$

and $$H_{C1} = 8,000O\text{-}e > H_{C2} + (\sigma_w/2M_{S1}t_1) + (\sigma_w/2M_{S2}t_2) = 4,389Oe \qquad \text{Formula 22}$$

In Formula 25, since $$H_{C1} - (\sigma_w/2M_{S1}t_1) = 6,889Oe$$

$$H_{C2} + (\sigma_w/2M_{S2}t_2) = 3,278Oe$$

if an initial field (Hini.) is 4,000 Oe, the medium No. 3 can satisfy Formula 25. Thus, the direction of magnetization of the reference layer 2 is reversed at the room temperature due to the initial field (Hini.) without reversing that of the recording layer 1.

In addition, since the medium No. 3 satisfies:

$$H_{C1} = 8,000Oe > (\sigma_w/2M_{S1}t_1) = 1,111Oe \qquad \text{Formula 23}$$

and $$H_{C2} = 3,000Oe > (\sigma_w/2M_{S2}t_2) = 278Oe \qquad \text{Formula 2}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled.

(Example 4 . . . One of Media No. 4)

A 1,000-Å thick first layer (recording layer) of $Tb_{13}Dy_{13}Fe_{74}$ and a 1,000-Å thick second layer (reference layer) of $Gd_{14}Dy_{14}Fe_{72}$ were sequentially formed on a substrate in the same manner as in Example 1. Then, a medium No. 4 belonging to Class 4 (i.e., P type, Quadrant I, and Type 4) was manufactured.

Table 5 below shows the manufacturing conditions and characteristics of the medium No. 4.

TABLE 5

|  | Recording Layer 1 | Reference Layer 2 |
|---|---|---|
| Evaporation Source (2 Elements) | TbDy alloy Fe | GdDy alloy Fe |
| Film Thickness t(Å) | 1000 | 1000 |
| Ms (emu/cc) | 80 | 160 |
| Hc (Oe) | 8000 | 3000 |
| Tc (°C.) | 100 | 140 |
| Tcomp. (°C.) | None | None |
| $\sigma_w$ (Room Temperature) | 0.8 erg/cm² | |

If $T_L = 120°$ C. and $T_H = 160°$ C. (see Example 16), this medium satisfies:

$$T_R < T_{C1} \approx T_L < T_{C2} \approx T_H \qquad \text{Formula 26}$$

and $$H_{C1} = 8,000O\text{-}e > H_{C2} + (\sigma_w/2M_{S1}t_1) + (\sigma_w/2M_{S2}t_2) = 3,750Oe \qquad \text{Formula 27}$$

In Formula 30, since $$H_{C1} - (\sigma_w/2M_{S1}t_1) = 7,500Oe$$

$$H_{C2} + (\sigma_w/2M_{S2}t_2) = 3,250Oe$$

if an initial field (Hini.) is 4,000 Oe, the medium No. 4 can satisfy Formula 30. Thus, the direction of magnetization of the reference layer 2 is reversed at the room temperature due to the initial field (Hini.) without reversing that of the recording layer 1.

In addition, since the medium No. 4 satisfies:

$$H_{C1} = 8,000Oe > (\sigma_w/2M_{S1}t_1) = 5000e \qquad \text{Formula 28}$$

and $$H_{C2} = 3,000Oe > (\sigma_w/2M_{S2}t_2) = 250Oe \qquad \text{Formula 29}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled.

(Example 5 . . . One of Media No. 5)

A 500-Å thick first layer (recording layer) of $Gd_{13}DY_{13}Fe_{74}$ and a 600-Å thick second layer (reference layer) of $Tb_{18}Fe_{74}Co_8$ were sequentially formed on a substrate in the same manner as in Example 1. Then, a medium No. 5 belonging to Class 5 (i.e., A type, Quadrant II, and Type 3) was manufactured.

Table 6 below shows the manufacturing conditions and characteristics of the medium No. 5.

TABLE 6

|  | Recording Layer 1 | Reference Layer 2 |
|---|---|---|
| Evaporation Source (2 Elements) | GdDy alloy Fe | Tb FeCo alloy |
| Film Thickness t(Å) | 500 | 600 |
| Ms (emu/cc) | 90 | 150 |
| Hc (Oe) | 6000 | 3000 |
| Tc (°C.) | 145 | 200 |
| Tcomp. (°C.) | 120 | None |
| $\sigma_w$ (Room Temperature) | 0.8 erg/cm² | |

If $T_L = 165°$ C. and $T_H = 210°$ C. (see Example 17), this medium satisfies:

$$T_R < Tcomp.1 < T_{C1} \approx T_L < T_{C2} \approx T_H \qquad \text{Formula 31}$$

and $$H_{C1} = 6,000O\text{-}e > H_{C2} + |(\sigma_w/2M_{S1}t_1) - (\sigma_w/2M_{S2}t_2)| = 3,445\text{-}Oe \qquad \text{Formula 32}$$

In Formula 35, since $$H_{C1} + (\sigma_w/2M_{S1}t_1) = 6,889Oe$$

$$H_{C2} + (\sigma_w/2M_{S2}t_2) = 3,444Oe$$

if an initial field (Hini.) is 4,000 Oe, the medium No. 5 can satisfy Formula 35. Thus, the direction of magnetization of the reference layer 2 is reversed at the room temperature due to the initial field (Hini.) without reversing that of the recording layer 1.

In addition, since the medium No. 5 satisfies:

$$H_{C1}=6,000Oe > (\sigma_w/2M_{S1}t_1)=889Oe \quad \text{Formula 33}$$

and $$H_{C2}=3,000Oe > (\sigma_w/2M_{S2}t_2)=444Oe \quad \text{Formula 34}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled.

(Example 6 . . . One of Media No. 6)

A 3-element RF magnetron sputtering apparatus was used and included three targets Tb, Fe, and FeCo alloy shown in Table 7. Targets Tb and Fe were first used, and Tb and FeCo alloy were then used. A 1.2-mm thick, 200-mm diameter glass substrate was placed inside a chamber of the apparatus.

The chamber of the apparatus was temporarily evacuated to a vacuum of $7\times 10^{-7}$ Torr. or less, and $5\times 10^{-3}$ Torr. of Ar gas was introduced therein. Then, sputtering was performed at a deposition rate of about 2 Å/sec. Thereby, a 500-Å thick first layer (recording layer) of $Tb_{27}Fe_{73}$ was formed on the substrate. Subsequently, the targets were replaced while maintaining the vacuum state. Thereafter, sputtering was performed again to form a 1,000-Å thick second layer of $Tb_{18}Fe_{74}Co_8$ on the first layer. Note that the first and second layers were perpendicular magnetic films.

In this way, a double-layered magnetooptical recording medium No.6 belonging to Class 6 (i.e., A type, Quadrant II, and Type 4) was manufactured.

Table 7 shows the manufacturing conditions and characteristics of the medium No. 6.

TABLE 7

|  | Recording Layer 1 | Reference Layer 2 |
|---|---|---|
| Target | Tb | Tb |
| (2 Elements) | Fe | FeCo alloy |
| Film Thickness t(Å) | 500 | 1000 |
| Ms (emu/cc) | 120 | 150 |
| Hc (Oe) | 7000 | 3000 |
| Tc (°C.) | 135 | 200 |
| Tcomp. (°C.) | None | None |
| $\sigma_w$ (Room Temperature) | 1.5 erg/cm² | |

If $T_L=155°$ C. and $T_H=220°$ C. (see Example 18), this medium satisfies:

$$T_R < T_{C1} \approx T_L < T_{C2} \approx T_H \quad \text{Formula 36}$$

and $$H_{C1}=7,000\text{-}e > H_{C2}+|(\sigma_w/2M_{S1}t_1)-(\sigma_w/2M_{S2}t_2)|=3,750\text{-}Oe \quad \text{Formula 37}$$

In Formula 40, since $$H_{C1}+(\sigma_w/2M_{S1}t_1)=8,250Oe$$

$$H_{C2}+(\sigma_w/2M_{S2}t_2)=3,500Oe$$

if an initial field (Hini.) is 4,000 Oe, the medium No. 6 can satisfy Formula 40. Thus, the direction of magnetization of the reference layer 2 is reversed at the room temperature due to the initial field (Hini.) without reversing that of the recording layer 1.

In addition, since the medium No. 6 satisfies:

$$H_{C1}=7,000Oe > (\sigma_w/2M_{S1}t_1)=1,250Oe \quad \text{Formula 38}$$

and $$H_{C2}=3,000Oe > (\sigma_w/2M_{S2}t_2)=500Oe \quad \text{Formula 39}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled.

(Example 7 . . . One of Media No. 7)

A 1,000-Å thick first layer (recording layer) of $Tb_{21}Fe_{79}$ and a 1,000-Å thick second layer (reference layer) of $Tb_{18}Fe_{74}Co_8$ were sequentially formed on a substrate in the same manner as in Example 6. Then, a medium No. 7 belonging to Class 7 (i.e., P type, Quadrant III, and Type 4) was manufactured.

Table 8 shows the manufacturing conditions and characteristics of the medium No. 7.

TABLE 8

|  | Recording Layer 1 | Reference Layer 2 |
|---|---|---|
| Target | Tb | Tb |
| (2 Elements) | Fe | FeCo alloy |
| Film Thickness t(Å) | 1000 | 1000 |
| Ms (emu/cc) | 70 | 150 |
| Hc (Oe) | 7000 | 3000 |
| Tc (°C.) | 135 | 200 |
| Tcomp. (°C.) | None | None |
| $\sigma_w$ (Room Temperature) | 1.5 erg/cm² | |

If $T_L=155°$ C. and $T_H=220°$ C. (see Example 19), this medium satisfies:

$$T_R < T_{C1} \approx T_L < T_{C2} \approx T_H \quad \text{Formula 41}$$

and $$H_{C1}=7,000\text{-}e > H_{C2}+(\sigma_w/2M_{S1}t_1)+(\sigma_w/2M_{S2}t_2)=4,571Oe \quad \text{Formula 42}$$

In Formula 45, since $$H_{C1}-(\sigma_w/2M_{S1}t_1)=5,929Oe$$

$$H_{C2}+(\sigma_w/2M_{S2}t_2)=3,500Oe$$

if an initial field (Hini.) is 4,000 Oe, the medium No. 7 can satisfy Formula 45. Thus, the direction of magnetization of the reference layer 2 is reversed at the room temperature due to the initial field (Hini.) without reversing that of the recording layer 1.

In addition, since the medium No. 7 satisfies:

$$H_{C1}=7,000Oe > (\sigma_w/2M_{S1}t_1)=1,071Oe \quad \text{Formula 43}$$

and $$H_{C2}=3{,}000Oe>(\sigma_w/2M_{S2}t_2)=500Oe \qquad \text{Formula 44}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled.

(Example 8 ... One of Media 8)

A 500-Å thick first layer (recording layer) of $Tb_{21}Fe_{79}$ and a 2,000-Å thick second layer (reference layer) of $Gd_{24}Tb_3Fe_{73}$ were Sequentially formed on a substrate in the same manner as in Example 6. Then, a medium No. 8 belonging to Class 8 (i.e., A type, Quadrant IV, and Type 2) was manufactured.

Table 9 shows the manufacturing conditions and characteristics of the medium No. 8.

TABLE 9

|  | Recording Layer 1 | Reference Layer 2 |
| --- | --- | --- |
| Target (2 Elements) | Tb Fe | GdTb alloy Fe |
| Film Thickness t(Å) | 500 | 2000 |
| Ms (emu/cc) | 70 | 170 |
| Hc (Oe) | 7000 | 350 |
| Tc (°C.) | 135 | 210 |
| Tcomp. (°C.) | None | 170 |
| $\sigma_w$ (Room Temperature) | 1.5 erg/cm² | |

If $T_L$=155° C. and $T_H$=230° C. (see Example 20), this medium satisfies:

$$T_R<T_{C1}\approx T_L\approx Tcomp.2<T_{C2}\approx T_H \qquad \text{Formula 46}$$

and $$H_{C1}=7{,}000\text{-}e>H_{C2}+|(\sigma_w/2M_{S1}t_1)-(\sigma_w/2M_{S2}t_2)|=2{,}273\text{-}Oe \qquad \text{Formula 47}$$

In Formula 50, since $$H_{C1}+(\sigma_w/2M_{S1}t_1)=9{,}143Oe$$

$$H_{C2}+(\sigma_w/2M_{S2}t_2)=570Oe$$

if an initial field (Hini.) is 800 Oe, the medium No. 8 can satisfy Formula 50. Thus, the direction of magnetization of the reference layer 2 is reversed at the room temperature due to the initial field (Hini.) without reversing that of the recording layer 1.

In addition, since the medium No. 8 satisfies:

$$H_{C1}=7{,}000Oe>(\sigma_w/2M_{S1}t_1)=2{,}143Oe \qquad \text{Formula 48}$$

and $$H_{C2}=350Oe>(\sigma_w/2M_{S2}t_2)=220Oe \qquad \text{Formula 49}$$

if the initial field (Hini.) is removed, magnetization of the layers 1 and 2 can be maintained.

Therefore, when the initial field (Hini.)=800 Oe is applied in the "A direction" (↑) and the bias field Hb=800 Oe is applied in the "A direction" (↑), an over-write operation is enabled. Note that since the levels and the directions of the fields Hb and Hini. are equal to each other, the recording apparatus which uses a single applying means for applying both the fields Hb and Hini. can be used.

(Example 9 ... One of Media 9)

A 1,000-Å thick first layer (recording layer) of $Gd_4Tb_{19}Fe_{77}$ and a 500-Å thick second layer (reference layer) of $Tb_{29}Fe_{61}Co_{10}$ were sequentially formed on a substrate in the same manner as in Example 1. Then, a medium No. 9 belonging to Class 9 (i.e., A type, Quadrant IV, and Type 4) was manufactured.

Table 10 shows the manufacturing conditions and characteristics of the medium No. 9.

TABLE 10

|  | Recording Layer 1 | Reference Layer 2 |
| --- | --- | --- |
| Evaporation Source (2 Elements) | GdTb alloy Fe | Tb FeCo alloy |
| Film Thickness t(Å) | 1000 | 500 |
| Ms (emu/cc) | 30 | 200 |
| Hc (Oe) | 7000 | 3000 |
| Tc (°C.) | 150 | 220 |
| Tcomp. (°C.) | None | None |
| $\sigma_w$ (Room Temperature) | 1.0 erg/cm² | |

If $T_L$=170° C. and $T_H$=220° C. (see Example 21), this medium satisfies:

$$T_R<T_{C1}\approx T_L<T_{C2}\approx T_H \qquad \text{Formula 51}$$

and $$H_{C1}=7{,}000\text{-}e>H_{C2}+|(\sigma_w/2M_{S1}t_1)-(\sigma_w/2M_{S2}t_2)|=4{,}167\text{-}Oe \qquad \text{Formula 52}$$

In Formula 55, since $$H_{C1}+(\sigma_w/2M_{S1}t_1)=8{,}667Oe$$

$$H_{C2}+(\sigma_w/2M_{S2}t_2)=3{,}500Oe$$

if an initial field (Hini.) is 4,000 Oe, the medium No. 9 can satisfy Formula 55. Thus, the direction of magnetization of the reference layer 2, is reversed at the room temperature due to the initial field (Hini.) without reversing that of the recording layer 1.

In addition, since the medium No. 9 satisfies:

$$H_{C1}=7{,}000Oe>(\sigma_w/2M_{S1}t_1)=1{,}667Oe \qquad \text{Formula 53}$$

and $$H_{C2}=3{,}000Oe>(\sigma_w/2M_{S2}t_2)=500Oe \qquad \text{Formula 54}$$

if the initial field (Hini.) is removed, magnetization of the layers 1 and 2 can be maintained.

Therefore, when the initial field (Hini.)=4,000 Oe is applied in the "A direction" (↑) and the bias field Hb=300 Oe is applied in the "non-A direction" (↓), an over-write operation is enabled. (Example 10 ... Magnetooptical Recording Apparatus)

This apparatus is for recording only, and FIG. 3 shows the overall arrangement thereof.

The apparatus basically comprises:
(a) a rotating means 21 as a means for moving a recording medium 20;
(b) an initial field (Hini.) applying means 22;
(c) a laser beam light source 23;
(d) a means 24 for pulse modulating, in accordance with binary data to be recorded, a beam intensity (1) to obtain high level which provides a medium temperature $T_H$ suitable for forming one of a bit having upward-magnetization and a bit having downward-magnetization and (2) to obtain low level which provides a medium temperature $T_L$ suitable for forming the other bit; and (e) a bias field (Hb) applying means 25.

The bias field (Hb) applying means 25 normally comprises an electromagnet or, preferably, a permanent magnet. Alternatively, a stray field from a portion other than recording tracks of the recording medium can be used as the bias field Hb. In this case, the applying means 25 indicates a region of perpendicular magnetic films (first and second layers) of the recording medium 20, which produces the stray field.

In this example, a permanent magnet which produced a bias field Hb=300 Oe and had a direction of magnetization along the "non-A direction" ( ↓ ) was used as the applying means 25. The permanent magnet 25 had a rod-like shape having a length corresponding to the radius of the disk-shaped medium 20 and was fixed in the apparatus. The permanent magnet 25 was not moved together with a recording head (pickup) including the light source 23. This made the pickup light, and allowed high-speed access.

An electromagnet or, preferably, a permanent magnet was used as the initial field (Hini.) applying means 22. In this example, a permanent magnet which produced an initial field (Hini.)=4,000 Oe and had a direction of magnetization along the "A direction" ( ↑ ) was used. The permanent magnet 22 had a rod-like shape having a length corresponding to the radius of the disk-shaped medium 20 and was fixed in the apparatus.

Note that a reproduction apparatus can be added to the recording apparatus of this example as a recording-/reproduction apparatus.

(Example 11 ... Magnetooptical Recording Apparatus)

This apparatus is for recording only, and FIG. 4 shows the overall arrangement thereof.

The apparatus basically comprises:

(a) a rotating means 21 as a means for moving a recording medium 20;

(c) a laser beam light source 23;

(d) a means 24 for pulse modulating, in accordance with binary data to be recorded, a beam intensity (1) to obtain high level which provides a medium temperature $T_H$ suitable for forming one of a bit having upward-magnetization and a bit having downward-magnetization and (2) to obtain low level which provides a medium temperature $T_L$ suitable for forming the other bit; and (b, e) a bias field (Hb) applying means 25, which also serves as an initial field (Hini.) applying means 22.

When the directions of the bias field (Hb) and the initial field (Hini.) coincide with each other, the applying means 25 can also be used as the applying means 22. More specifically, if the applying means 25 is arranged at a recording position (a spot region irradiated with a beam) at which a magnetic field is to be concentrated, it is impossible to concentrate the magnetic field at a point. In other words, a leaking magnetic field is inevitably applied around the recording point. Therefore, if the leaking magnetic field is utilized, the initial field (Hini.) can be applied before recording. For this reason, in the apparatus of this example, the means 25 served as the means 22.

The means 25 and 22 normally comprise electromagnets or, preferably, permanent magnets. In this example, permanent magnets which produced a bias field Hb (Hini.)=600 Oe and had a direction of magnetization along the "A direction" ( ↑ ) were used as means 22 and 25. The permanent magnets 22 and 25 had a rod-like shape having a length corresponding to the radius of the disk-shaped recording medium 20. The magnets 22 and 25 were fixed to the apparatus of this example, and were not moved together with a pickup including the light source 23. This made the pickup light, and allowed high-speed access.

(Example 12 ... Magnetooptical Recording Apparatus)

This apparatus is for recording only, and FIG. 4 shows the overall arrangement thereof.

The apparatus basically comprises:

(a) a rotating means 21 as a means for moving a recording medium 20;

(c) a laser beam light source 23;

(d) a means 24 for pulse modulating, in accordance with binary data to be recorded, a beam intensity (1) to obtain high level which provides a medium temperature $T_H$ suitable for forming one of a bit having upward-magnetization and a bit having downward-magnetization and (2) to obtain low level which provides a medium temperature $T_L$ suitable for forming the other bit; and (b, e) a bias field (Hb) applying means 25, which also serves as an initial field (Hini.) applying means 22.

In this example, permanent magnets which produced a bias field Hb (Hini.)=600 Oe and had a direction of magnetization along the "A direction" ( ↑ ) were used as means 22 and 25. The permanent magnets 22 and 25 had a rod-like shape having a length corresponding to the radius of the disk-shaped recording medium 20. The magnets 22 and 25 were fixed to the apparatus of this example, and were not moved together with a pickup including the light source 23.

(Example 13 ... Magnetooptical Recording)

A magnetooptical recording operation was performed using the recording apparatus of Example 11 (see FIG. 4). First, the recording medium 20 of Example 1 was rotated at a constant speed of 8.5 m/sec by the rotating means 21. A laser beam was radiated onto the medium 20. The laser beam was adjusted by the means 24 to obtain an output of 9.3 mW (on disk) at high level and to obtain an output of 6.6 mW (on disk) at low level. The laser beam was pulse modulated by the means 24 in accordance with data to be recorded. In this example, the data to be recorded was a signal having a frequency of 1 MHz. Therefore, the laser beam was radiated onto the medium 20 while being modulated at the frequency of 1 MHz. As a result, a 1-MHz signal was recorded. When this signal was reproduced by another magnetooptical reproduction apparatus, a C/N ratio was 51 dB and it was confirmed therefrom that the signal was actually recorded.

A signal of a frequency of 5 MHz was newly recorded on an already recorded region of the medium 20.

When the signal was similarly reproduced, it could be reproduced at a C/N ratio of 48 dB. In this case, a bit error rate was $10^{-5}$ to $10^{-6}$. In addition, the 1-MHz signal (preceding data) was not reproduced at all.

As a result, it was found that an over-write operation was enabled.

Note that under these conditions, the temperature of the medium reached $T_H=230°$ C. at high level and $T_L=170°$ C. at low level.

(Example 14 ... Magnetooptical Recording)

A magnetooptical recording operation was performed using the recording apparatus of Example 11 (see FIG. 4). First, the recording medium 20 of Example 2 was rotated at a constant speed of 8.5 m/sec by the rotating means 21. A laser beam was radiated onto the medium 20. The laser beam was adjusted by the means 24 to obtain an output of 9.3 mW (on disk) at high level and to obtain an output of 5.7 mW (on disk) at low level. The laser beam was pulse modulated by the means 24 in accordance with data to be recorded. In this example, the data to be recorded was a signal having a frequency of 1 MHz. Therefore, the laser beam was radiated onto the medium 20 while being modulated at the frequency of 1 MHz. As a result, a 1-MHz signal was recorded. When this signal was reproduced by another magnetooptical reproduction apparatus, a C/N ratio was 52 dB and it was confirmed therefrom that the signal was actually recorded.

A signal of a frequency of 5 MHz was newly recorded on an already recorded region of the medium 20.

When the signal was similarly reproduced, it could be reproduced at a C/N ratio of 49 dB. In this case, a bit error rate was $10^{-5}$ to $10^{-6}$. In addition, the 1-MHz signal (preceding data) was not reproduced at all.

As a result, it was found that an over-write operation was enabled.

Note that under these conditions, the temperature of the medium reached $T_H=230°$ C. at high level and $T_L=150°$ C. at low level.

(Example 15 ... Magnetooptical Recording)

A magnetooptical recording operation was performed using the recording apparatus of Example 10 (see FIG. 3). First, the recording medium 20 of Example 3 was rotated at a constant speed of 8.5 m/sec by the rotating means 21. A laser beam was radiated onto the medium 20. The laser beam was adjusted by the means 24 to obtain an output of 8.9 mW (on disk) at high level and to obtain an output of 6.6 mW (on disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 51 dB and it was confirmed therefrom that the signal was actually recorded.

A signal of a frequency of 2 MHz was newly recorded on an already recorded region of the medium 20.

When the signal was similarly reproduced, it could be reproduced at a C/N ratio of 54 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H=220°$ C. at high level and $T_L=170°$ C. at low level.

(Example 16 ... Magnetooptical Recording)

A magnetooptical recording operation was performed using the recording apparatus of Example 10 (see FIG. 3). First, the recording medium 20 of Example 4 was rotated at a constant speed of 8.5 m/sec by the rotating means 21. A laser beam was radiated onto the medium 20. The laser beam was adjusted by the means 24 to obtain an output of 6.1 mW (on disk) at high level and to obtain an output of 4.3 mW (on-disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 47 dB and it was confirmed therefrom that the signal was actually recorded.

A signal of a frequency of 2 MHz was newly recorded on an already recorded region of the medium 20.

When the signal was similarly reproduced, it could be reproduced at a C/N ratio of 50 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H=160°$ C. at high level and $T_L=120°$ at low level.

(Example 17 ... Magnetooptical Recording)

A magnetooptical recording operation was performed using the recording apparatus of Example 10 (see FIG. 3). First, the recording medium 20 of Example 5 was rotated at a constant speed of 8.5 m/sec by the rotating means 21. A laser beam was radiated onto the medium 20. The laser beam was adjusted by the means 24 to obtain an output of 8.4 mW (on disk) at high level and to obtain an output of 6.4 mW (on disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 48 dB and it was confirmed therefrom that the signal was actually recorded.

A signal of a frequency of 4 MHz was newly recorded on an already recorded region of the medium 20.

When the signal was similarly reproduced, it could be reproduced at a C/N ratio of 49 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H=210°$ C. at high level and $T_L=165°$ C. at low level.

(Example 18 ... Magnetooptical Recording)

A magnetooptical recording operation was performed using the recording apparatus of Example 10

(see FIG. 3). First, the recording medium 20 of Example 6 was rotated at a constant speed of 8.5 m/sec by the rotating means 21. A laser beam was radiated onto the medium 20. The laser beam was adjusted by the means 24 to obtain an output of 8.1 mW (on disk) at high level and to obtain an output of 5.9 mW (on disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 49 dB and it was confirmed therefrom that the signal was actually recorded.

A signal of a frequency of 3 MHz was newly recorded on an already recorded region of the medium 20.

When the signal was similarly reproduced, it could be reproduced at a C/N ratio of 51 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H = 220°$ C. at high level and $T_L = 155°$ C. at low level.

(Example 19 . . . Magnetooptical Recording)

A magnetooptical recording operation was performed using the recording apparatus of Example 10 (see FIG. 3). First, the recording medium 20 of Example 7 was rotated at a constant speed of 8.5 m/sec by the rotating means 21. A laser beam was radiated onto the medium 20. The laser beam was adjusted by the means 24 to obtain an output of 8.9 mW (on disk) at high level and to obtain an output of 5.9 mW (on disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 49 dB and it was confirmed therefrom that the signal was actually recorded.

A signal of a frequency of 2 MHz was newly recorded on an already recorded region of the medium 20.

When the signal was similarly reproduced, it could be reproduced at a C/N ratio of 52 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H = 220°$ C. at high level and $T_L = 155°$ C. at low level.

(Example 20 . . . Magnetooptical Recording)

A magnetooptical recording operation was performed using the recording apparatus of Example 12 (see FIG. 4). First, the recording medium 20 of Example 8 was rotated at a constant speed of 8.5 m/sec by the rotating means 21. A laser beam was radiated onto the medium 20. The laser beam was adjusted by the means 24 to obtain an output of 9.3 mW (on disk) at high level and to obtain an output of 5.9 mW (on disk) at low level. The laser beam was pulse modulated by the means 24 in accordance with data to be recorded. In this example, the data to be recorded was a signal having a frequency of 1 MHz. Therefore, the laser beam was radiated onto the medium 20 while being modulated at the frequency of 1 MHz. As a result, a 1-MHz signal was recorded. When this signal was reproduced by another magnetooptical reproduction apparatus, a C/N ratio was 52 dB and it was confirmed therefrom that the signal was actually recorded.

A signal of a frequency of 2 MHz was newly recorded on an already recorded region of the medium 20.

When the signal was similarly reproduced, it could be reproduced at a C/N ratio of 51 dB. In this case, a bit error rate was $10^{-5}$ to $10^{-6}$. In addition, the 1-MHz signal (preceding data) was not reproduced at all.

As a result, it was found that an over-write operation was enabled.

Note that under these conditions, the temperature of the medium reached $T_H = 230°$ C. at high level and $T_L = 155°$ C. at low level.

(Example 21 . . . Magnetooptical Recording)

A magnetooptical recording operation was performed using the recording apparatus of Example 10 (see FIG. 3). First, the recording medium 20 of Example 9 was rotated at a constant speed of 8.5 m/sec by the rotating means 21. A laser beam was radiated onto the medium 20. The laser beam was adjusted by the means 24 to obtain an output of 8.9 mW (on disk) at high level and to obtain an output of 6.6 mW (on disk) at low level. The laser beam was pulse modulated by the means 24 in accordance with data to be recorded. In this example, the data to be recorded was a signal having a frequency of 5 MHz. Therefore, the laser beam was radiated onto the medium 20 while being modulated at the frequency of 5 MHz. As a result, a 5-MHz signal was recorded. When this signal was reproduced by another magnetooptical reproduction apparatus, a C/N ratio was 51 dB and it was confirmed therefrom that the signal was actually recorded.

A signal of a frequency of 6 MHz was newly recorded on an already recorded region of the medium 20.

When the signal was similarly reproduced, it could be reproduced at a C/N ratio of 49 dB. In this case, a bit error rate was $10^{-5}$ to $10^{-6}$. In addition, the 5-MHz signal (preceding data) was not reproduced at all.

As a result, it was found that an over-write operation was enabled.

Note that under these conditions, the temperature of the medium reached $T_H = 220°$ C. at high level and $T_L = 170°$ C. at low level.

(Example 22 . . . Recording Medium No. 11)

In Example 1, a third layer (transcription layer) was formed before formation of the first layer under the same conditions. The third layer was a perpendicular magnetic film of a 500-Å thick $Gd_{26}Fe_{52}Co_{22}$.

A recording medium No. 11 was manufactured following the same procedures as in Example 1 except that the third layer was formed. Table 11 shows the manufacturing conditions and characteristics of the medium No. 11.

TABLE 11

|  | First Layer | Second Layer | Third Layer |
| --- | --- | --- | --- |
| Evaporation Source (2 Elements) | GdDy alloy Fe | GdTb alloy Fe | Gd FeCo alloy |
| Film Thickness t(Å) | 1000 | 2000 | 500 |
| Ms (emu/cc) | 100 | 170 | 75 |
| Hc (Oe) | 5600 | 350 | 100 |
| Tc (°C.) | 150 | 210 | 380 |
| Tcomp. (°C.) | 110 | 170 | 160 |
| σw (Room temperature) | 0.8 erg/cm$^2$ | | |

(Example 23 ... Recording Medium No. 12)

In Example 2, a third layer (transcription layer) was formed before formation of the first layer under the same conditions. The third layer was a perpendicular magnetic film of a 500-Å thick $Gd_{26}Fe_{52}Co_{22}$.

A recording medium No.12 was manufactured following the same procedures as in Example 2 except that the third layer was formed. Table 12 shows the manufacturing conditions and characteristics of the medium No. 12.

TABLE 12

|  | First Layer | Second Layer | Third Layer |
| --- | --- | --- | --- |
| Evaporation Source (2 Elements) | Tb Fe | GdTb alloy Fe | Gd FeCo alloy |
| Film Thickness t(Å) | 500 | 2000 | 500 |
| Ms (emu/cc) | 120 | 170 | 75 |
| Hc (Oe) | 7000 | 350 | 100 |
| Tc (°C.) | 135 | 210 | 380 |
| Tcomp. (°C.) | — | 170 | 160 |
| σw (Room temperature) | 1.0 erg/cm$^2$ | | |

(Example 24 ... Recording Medium No. 13)

In Example 3, a third layer (transcription layer) was formed before formation of the first layer under the same conditions. The third layer was a perpendicular magnetic film of a 500-Å thick $Gd_{22}Fe_{55}Co_{23}$.

A recording medium No. 13 was manufactured following the same procedures as in Example 3 except that the third layer was formed. Table 13 shows the manufacturing conditions and characteristics of the medium No. 13.

TABLE 13

|  | First Layer | Second Layer | Third Layer |
| --- | --- | --- | --- |
| Evaporation Source (2 Elements) | GdTb alloy Fe | Tb FeCo alloy | Gd FeCo alloy |
| Film Thickness t(Å) | 500 | 1000 | 500 |
| Ms (emu/cc) | 90 | 180 | 80 |
| Hc (Oe) | 8000 | 3000 | 100 |
| Tc (°C.) | 150 | 200 | 380 |
| Tcomp. (°C.) | 120 | — | — |
| σw (Room temperature) | 1.0 erg/cm$^2$ | | |

(Example 25 ... Recording Medium No. 14)

In Example 4, a third layer (transcription layer) was formed before formation of the first layer under the same conditions. The third layer was a perpendicular magnetic film of a 400-Å thick $Gd_{22}Fe_{55}Co_{23}$.

A recording medium No. 14 was manufactured following the same procedures as in Example 4 except that the third layer was formed. Table 14 shows the manufacturing conditions and characteristics of the medium No. 14.

TABLE 14

|  | First Layer | Second Layer | Third Layer |
| --- | --- | --- | --- |
| Evaporation Source (2 Elements) | TbDy alloy Fe | GdDy alloy Fe | Gd FeCo alloy |
| Film Thickness t(Å) | 1000 | 1000 | 400 |
| Ms (emu/cc) | 80 | 160 | 80 |
| Hc (Oe) | 8000 | 3000 | 100 |
| Tc (°C.) | 100 | 140 | 380 |
| Tcomp. (°C.) | — | — | — |
| σw (Room temperature) | 0.8 erg/cm$^2$ | | |

(Example 26 ... Recording Medium No. 15)

In Example 5, a third layer (transcription layer) was formed before formation of the first layer under the same conditions. The third layer was a perpendicular magnetic film of a 500-Å thick $Gd_{22}Fe_{55}Co_{23}$.

A recording medium No. 15 was manufactured following the same procedures as in Example 5 except that the third layer was formed. Table 15 shows the manufacturing conditions and characteristics of the medium No. 15.

TABLE 15

|  | First Layer | Second Layer | Third Layer |
| --- | --- | --- | --- |
| Evaporation Source (2 Elements) | GdDy alloy Fe | Tb FeCo alloy | Gd FeCo alloy |
| Film Thickness t(Å) | 500 | 600 | 500 |
| Ms (emu/cc) | 90 | 150 | 80 |
| Hc (Oe) | 6000 | 3000 | 100 |
| Tc (°C.) | 145 | 200 | 380 |
| Tcomp. (°C.) | 120 | — | — |
| σw (Room temperature) | 0.8 erg/cm$^2$ | | |

(Example 27 ... Recording Medium No. 16)

In Example 6, a third layer (transcription layer) was formed before formation of the first layer under the same conditions. The third layer was a perpendicular magnetic film of a 300-Å thick $Gd_{22}Fe_{55}Co_{23}$.

A recording medium No.16 was manufactured following the same procedures as in Example 6 except that the third layer was formed. Table 16 shows the manufacturing conditions and characteristics of the medium No. 16.

TABLE 16

|  | First Layer | Second Layer | Third Layer |
| --- | --- | --- | --- |
| Target | TbFe alloy | TbFeCo alloy | GdFeCo alloy |
| Film Thickness t(Å) | 500 | 1000 | 300 |
| Ms (emu/cc) | 120 | 150 | 80 |
| Hc (Oe) | 7000 | 3000 | 100 |
| Tc (°C.) | 135 | 200 | 380 |
| Tcomp. (°C.) | — | — | — |
| σw (Room temperature) | 1.5 erg/cm$^2$ | | |

(Example 28 ... Recording Medium No. 17)

In Example 7, a third layer (transcription layer) was formed before formation of the first layer under the same conditions. The third layer was a perpendicular magnetic film of a 500-Å thick $Gd_{22}Fe_{55}Co_{23}$.

A recording medium No. 17 was manufactured following the same procedures as in Example 7 except that the third layer was formed. Table 17 shows the manufacturing conditions and characteristics of the medium No. 17.

TABLE 17

|  | First Layer | Second Layer | Third Layer |
|---|---|---|---|
| Target | TbFe alloy | TbFeCo alloy | GdFeCo alloy |
| Film Thickness t(Å) | 1000 | 1000 | 500 |
| Ms (emu/cc) | 70 | 150 | 80 |
| Hc (Oe) | 7000 | 3000 | 100 |
| Tc (°C.) | 135 | 200 | 380 |
| Tcomp. (°C.) | — | — | — |
| σw (Room temperature) | | 1.5 erg/cm$^2$ | |

(Example 29 . . . Recording Medium No. 18)

In Example 8, a third layer (transcription layer) was formed before formation of the first layer under the same conditions. The third layer was a perpendicular magnetic film of a 500-Å thick $Gd_{26}Fe_{52}Co_{22}$.

A recording medium No.18 was manufactured following the same procedures as in Example 8 except that the third layer Was formed. Table 18 shows the manufacturing conditions and characteristics of the medium No. 18.

TABLE 18

|  | First Layer | Second Layer | Third Layer |
|---|---|---|---|
| Target | TbFe alloy | GdTbFe alloy | GdFeCo alloy |
| Film Thickness t(Å) | 500 | 2000 | 500 |
| Ms (emu/cc) | 70 | 170 | 75 |
| Hc (Oe) | 7000 | 350 | 100 |
| Tc (°C.) | 135 | 210 | 380 |
| Tcomp. (°C.) | — | 170 | 160 |
| σw (Room temperature) | | 1.5 erg/cm$^2$ | |

(Example 30 . . . Recording Medium No. 19)

In Example 9, a third layer (transcription layer) was formed before formation of the first layer under the same conditions. The third layer was a perpendicular magnetic film of a 400-Å thick $Gd_{22}Fe_{55}Co_{23}$.

A recording medium No. 19 was manufactured following the same procedures as in Example 9 except that the third layer was formed. Table 19 shows the manufacturing conditions and characteristics of the medium No. 19.

TABLE 19

|  | First Layer | Second Layer | Third Layer |
|---|---|---|---|
| Evaporation Source (2 Elements) | GdTb alloy Fe | Tb FeCo alloy | Gd FeCo alloy |
| Film Thickness t(Å) | 1000 | 500 | 400 |
| Ms (emu/cc) | 30 | 200 | 80 |
| Hc (Oe) | 7000 | 3000 | 100 |
| Tc (°C.) | 150 | 220 | 380 |
| Tcomp. (°C.) | — | — | — |
| σw (Room temperature) | | 1.0 erg/cm$^2$ | |

(Example 31 . . . Magnetooptical Recording)

A 1-MHz signal was recorded following the same procedures as in Example 13 except that the medium of Example 22 was used in place of that of Example 1.

A reproduction beam was radiated onto the third layer (transcription layer), and a beam reflected by the third layer was processed by a known method, thereby reproducing data. In this case, a C/N ratio was 59 dB.

Next, a 5-MHz signal was over written. Data was reproduced from the third layer at a C/N ratio of 55 dB. The C/N ratio was improved by 7 dB as compared to Example 13.

(Example 32 . . . Magnetooptical Recording)

A 1-MHz signal was recorded following the same procedures as in Example 14 except that the medium of Example 23 was used in place of that of Example 2.

A reproduction beam was radiated onto the third layer (transcription layer), and a beam reflected by the third layer was processed by a known method, thereby reproducing data. In this case, a C/N ratio was 59 dB.

Next, a 5-MHz signal was over written. Data was reproduced from the third layer at a C/N ratio of 55 dB. The C/N ratio was improved by 6 dB as compared to Example 14.

(Example 33 . . . Magnetooptical Recording)

A 5-MHz signal was recorded following the same procedures as in Example 15 except that the medium of Example 24 was used in place of that of Example 3.

A reproduction beam was radiated onto the third layer (transcription layer), and a beam reflected by the third layer was processed by a known method, thereby reproducing data. In this case, a C/N ratio was 56 dB.

Next, a 2-MHz signal was over written. Data was reproduced from the third layer at a C/N ratio of 59.5 dB. The C/N ratio was improved by 5.5 dB as compared to Example 15.

(Example 34 . . . Magnetooptical Recording)

A 5-MHz signal was recorded following the same procedures as in Example 16 except that the medium of Example 25 was used in place of that of Example 4.

A reproduction beam was radiated onto the third layer (transcription layer), and a beam reflected by the third layer was processed by a known method, thereby reproducing data. In this case, a C/N ratio was 56 dB.

Next, a 2-MHz signal was over written. Data was reproduced from the third layer at a C/N ratio of 59.5 dB. The C/N ratio was improved by 9.5 dB as compared to Example 16.

(Example 35 . . . Magnetooptical Recording)

A 5-MHz signal was recorded following the same procedures as in Example 17 except that the medium of Example 26 was used in place of that of Example 5.

A reproduction beam was radiated onto the third layer (transcription layer), and a beam reflected by the third layer was processed by a known method, thereby reproducing data. In this case, a C/N ratio was 55 dB.

Next, a 4-MHz signal was over written. Data was reproduced from the third layer at a C/N ratio of 56 dB. The C/N ratio was improved by 7 dB as compared to Example 17.

(Example 36 . . . Magnetooptical Recording)

A 5-MHz signal was recorded following the same procedures as in Example 18 except that the medium of Example 27 was used in place of that of Example 6.

A reproduction beam was radiated onto the third layer (transcription layer), and a beam reflected by the third layer was processed by a known method, thereby reproducing data. In this case, a C/N ratio was 56 dB.

Next, a 3-MHz signal was over written. Data was reproduced from the third layer at a C/N ratio of 59 dB. The C/N ratio was improved by 8 dB as compared to Example 18.

(Example 37 . . . Magnetooptical Recording)

A 5-MHz signal was recorded following the same procedures as in Example 19 except that the medium of Example 28 was used in place of that of Example 7.

A reproduction beam was radiated onto the third layer (transcription layer), and a beam reflected by the third layer was processed by a known method, thereby reproducing data. In this case, a C/N ratio Was 56 dB.

Next, a 2-MHz signal was over written. Data was reproduced from the third layer at a C/N ratio of 59.5 dB. The C/N ratio was improved by 7.5 dB as compared to Example 19.

(Example 38 . . . Magnetooptical Recording)

A 1-MHz signal was recorded following the same procedures as in Example 20 except that the medium of Example 29 was used in place of that of Example 8.

A reproduction beam was radiated onto the third layer (transcription layer), and a beam reflected by the third layer was processed by a known method, thereby reproducing data. In this case, a C/N ratio was 59 dB.

Next, a 2-MHz signal was over written. Data was reproduced from the third layer at a C/N ratio of 58.5 dB. The C/N ratio was improved by 7.5 dB as compared to Example 20.

(Example 39 . . . Magnetooptical Recording)

A 5-MHz signal was recorded following the same procedures as in Example 21 except that the medium of Example 30 was used in place of that of Example 9, A reproduction beam was radiated onto the third layer (transcription layer), and a beam reflected by the third layer was processed by a known method, thereby reproducing data, In this case, a C/N ratio was 56 dB.

Next, a 6-MHz signal was over written. Data was reproduced from the third layer at a C/N ratio of 54 dB, The C/N ratio was improved by 5 dB as compared to Example 21.

(Example 40 . . . Reproduction Apparatus for Magneto-optical Recording)

This apparatus is for only reproduction, and FIG. 41 shows the overall arrangement thereof.

The apparatus basically comprises:
(a) a rotation means 21 for rotating a disk-shaped multilayered magnetooptical recording medium 20 capable of over writing;
(b) a reproduction field applying means 28 for causing data recorded in the first layer to be transcribed to the second layer before reproduction;
(c) a laser beam light source 23 as a linearly polarized light source;
(d) an optical analyzer 30 and a detector 31 constituting a reproduction means for receiving reflection light of linearly polarized light radiated on the second layer and reproducing data included in the reflection light in the form of an electrical signal. Note that the arrangement shown in FIG. 41 also includes a collimator lens 26, an objective lens 27, and a beam splitter 29.

As the reproduction field applying means 28, a permanent magnet of $H_R=300$ Oe and having a direction of magnetic field corresponding to the "non-A direction" ↕ is used. The permanent magnet 28 is a rod-like member having a length corresponding to the radial length of the disk-shaped recording medium 20, and is arranged on the left side of a laser beam irradiation position (position of a pickup including the light source 23) in the rotation direction. As a result, before reproduction, data recorded in the first layer by the means 28 can be transcribed to the second layer. The transcribed data can be reproduced, resulting in a high C/N ratio.

(Example 41 . . . Magnetooptical Recording/reproduction)

A magnetooptical recording operation was performed using the recording apparatus of Example 11 (see FIG. 4). First, the recording medium 20 of Example 1 was rotated at a constant linear speed of 8.5 m/sec by the rotating means 21.

A laser beam is radiated onto the medium 20 from the second layer side. The laser beam was adjusted by means 24 to obtain an output of 9.3 mW (on disk) at high level and to obtain an output of 6.6 mW (on disk) at low level. The laser beam was pulse-modulated by the means 24 in accordance with data to be recorded. In this case, the data to be recorded was a signal having a frequency of 1 MHz. Therefore, the laser beam was radiated onto the medium 20 while being modulated at the frequency of 1 MHz. As a result, a 1-MHz signal was recorded.

When the data was reproduced upon irradiation of the laser beam from the second layer by the magnetooptical reproduction apparatus of Example 40 (FIG. 41), a C/N ratio was 54 dB and it was confirmed therefrom that the signal was actually recorded. The C/N ratio of 54 dB was higher by 3 dB than a case wherein data was reproduced from the first layer without performing application processing of the reproduction field $H_R$ (see Example 13). This will be expressed hereinafter as (+3 dB) after 54 dB.

A signal having a frequency of 5 MHz was newly recorded on an already recorded region of the medium 20 by the apparatus of Example 11. When the data was similarly reproduced, the newly recorded data was reproduced at C/N ratio of 51 dB (+3 dB). A bit error rate was $10^{-5}$ to $10^{-6}$. In addition, the 1-MHz signal (preceding data) was not reproduced at all. As a result, it was found that an over-write operation was enabled.

Note that under these conditions, the temperature of the medium reached $T_H=230°$ C. at high level and $T_L=170°$ C. at low level.

What is claimed is:

1. A reproduction method for over write capable magnetooptical recording characterized in that in a disk-shaped multilayered magnetooptical recording medium capable of over writing and comprising a first layer, serving as a recording layer, in which data is recorded in the form of a bit having upward magnetization and a bit having downward magnetization and which has a perpendicular magnetic anisotropy, and a second layer, serving as a reference layer, a magnetization of which is aligned in a predetermined direction, said first layer being exchange coupled with said second layer, and the magnetization direction of said second layer being alignable in a predetermined direction at a room temperature without changing the magnetization direction of said first layer, data is recorded in the first layer and is transcribed to the second layer upon application of a reproduction magnetic field before reproduction, and the transcribed data is reproduced magnetooptically.

2. A reproduction method according to claim 1, wherein said medium is of an antiparallel type.

3. A reproduction method for a magnetooptical-recording comprising the steps of:
(a) moving a multilayered magnetooptical recording medium comprising a first layer, serving as a recording layer, in which data is recorded in the form of a bit having upward magnetization and a bit having downward magnetization and which has a perpendicular magnetic anisotropy, and a second layer, serving as a reference layer, a magnetization of which is aligned in a predetermined direction, said first layer being exchange coupled with said second layer, and the magnetization direction of said second layer being alignable in a predetermined direction at a room temperature without changing the magnetization direction of said first layer;
(b) transcribing data recorded in the first layer to the second layer; and
(c) reproducing magnetooptically the transcribed data.

4. A reproduction method for magnetooptically reproducing a bit recorded on a multilayered magnetooptical recording medium including a first magnetic layer and a second magnetic layer exchange coupled with said first layer, the magnetization direction of said second layer being alignable in a predetermined direction at a room temperature without changing the magnetization direction of said first layer, said method comprising radiating a laser beam on the recording medium to heat said medium at a temperature lower than a Curie point of said second layer, thereby forming said bit having a magnetization direction controlled by said second layer on said first layer, and then magnetooptically reproducing said bit.

5. A reproduction method for magnetooptically reproducing a bit by radiating a laser beam on a multilayered magnetooptical recording medium including a first magnetic layer and a second magnetic layer to heat said medium at a temperature lower than a Curie point of said second layer, thereby forming said bit having a magnetization direction controlled by said second layer on said first layer and then magnetooptically reproducing said bit.

* * * * *

UNITED STATES PATENT AND TRADEMARK OFFICE
CERTIFICATE OF CORRECTION

PATENT NO. : 5,440,531
DATED : August 8, 1995
INVENTOR(S) : Masatoshi SATO, Jun SAITO, and Hideki AKASAKA It is certified that error appears in the above-identified patent and that said Letters Patent is hereby corrected as shown below:

ON THE COVER PAGE:

In the listing under "[30] Foreign Application Priority Data", the following should be added:
--Dec. 8, 1986 [JP] Japan . . . . . 61-291728--.

Signed and Sealed this

Twenty-eighth Day of November, 2000

*Attest:*

Q. TODD DICKINSON

*Attesting Officer*  *Director of Patents and Trademarks*